United States Patent
Pantpratinidhi et al.

(10) Patent No.: US 10,672,401 B2
(45) Date of Patent: Jun. 2, 2020

(54) SPEECH AND VIDEO DUAL MODE GAUSSIAN MIXTURE MODEL SCORING ACCELERATOR

(71) Applicant: INTEL CORPORATION, Santa Clara, CA (US)

(72) Inventors: Nikhil Pantpratinidhi, El Dorado Hills, CA (US); Gokcen Cilingir, Sunnyvale, CA (US); Michael Deisher, Hillsboro, OR (US); Ohad Falik, Kfar Saba (IL); Michael Kounavis, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 826 days.

(21) Appl. No.: 15/198,193

(22) Filed: Jun. 30, 2016

(65) Prior Publication Data
US 2018/0007373 A1    Jan. 4, 2018

(51) Int. Cl.
*G06F 3/06* (2006.01)
*G10L 15/28* (2013.01)
*G06K 9/62* (2006.01)

(52) U.S. Cl.
CPC .............. *G10L 15/285* (2013.01); *G06F 3/06* (2013.01); *G06K 9/6212* (2013.01); *G06K 9/6226* (2013.01); *G06K 9/6277* (2013.01)

(58) Field of Classification Search
CPC .......................... G06F 3/0656; H04N 21/2368
See application file for complete search history.

(56) References Cited

U.S. PATENT DOCUMENTS

| | | | |
|---|---|---|---|
| 7,302,541 B2 * | 11/2007 | Hirezaki ................. | G06F 3/061 710/28 |
| 9,538,257 B2 * | 1/2017 | Haberman ....... | H04N 21/23424 |
| 2003/0026342 A1 * | 2/2003 | Horiike ................ | H04N 5/4401 375/240.25 |
| 2011/0060772 A1 * | 3/2011 | Warner ................. | G06F 3/0605 707/812 |

* cited by examiner

*Primary Examiner* — Daniel Abebe
(74) *Attorney, Agent, or Firm* — Jordan IP Law, LLC

(57) ABSTRACT

Systems, apparatus and methods are described including operations for a dual mode GMM (Gaussian Mixture Model) scoring accelerator for both speech and video data.

22 Claims, 22 Drawing Sheets

SPEECH AND VIDEO DUAL MODE GAUSSIAN MIXTURE MODEL SCORING ACCELERATOR

BACKGROUND

The GMM (Gaussian Mixture Model) Scoring operation has many well-known usages. In some implementations of GMM (Gaussian Mixture Model) scoring operation may be applied to automated electronic processing of speech recognition and other acoustic signals. Sometimes a dedicated hardware is provided to accelerate workloads that require high-throughput GMM scoring. Such dedicated hardware is typically specifically designed to handle speech recognition workloads.

In other implementations, GMM (Gaussian Mixture Model) scoring operation may be applied to automated electronic processing of image color density modeling in computer vision. GMM workloads in speech processing are fundamentally different than GMM workloads in image color modeling. Speech recognition involves processing relatively small number of samples (100 samples/sec) with large number of Gaussian clusters (thousands). Image color modeling on the other hand requires the processing of very large number of samples or pixels (in the millions) with small number of Gaussian clusters (less than 64). Accordingly, in cases where speech-specific dedicated hardware is available, such speech-specific dedicated hardware is not suitable to accelerate computer vision tasks.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
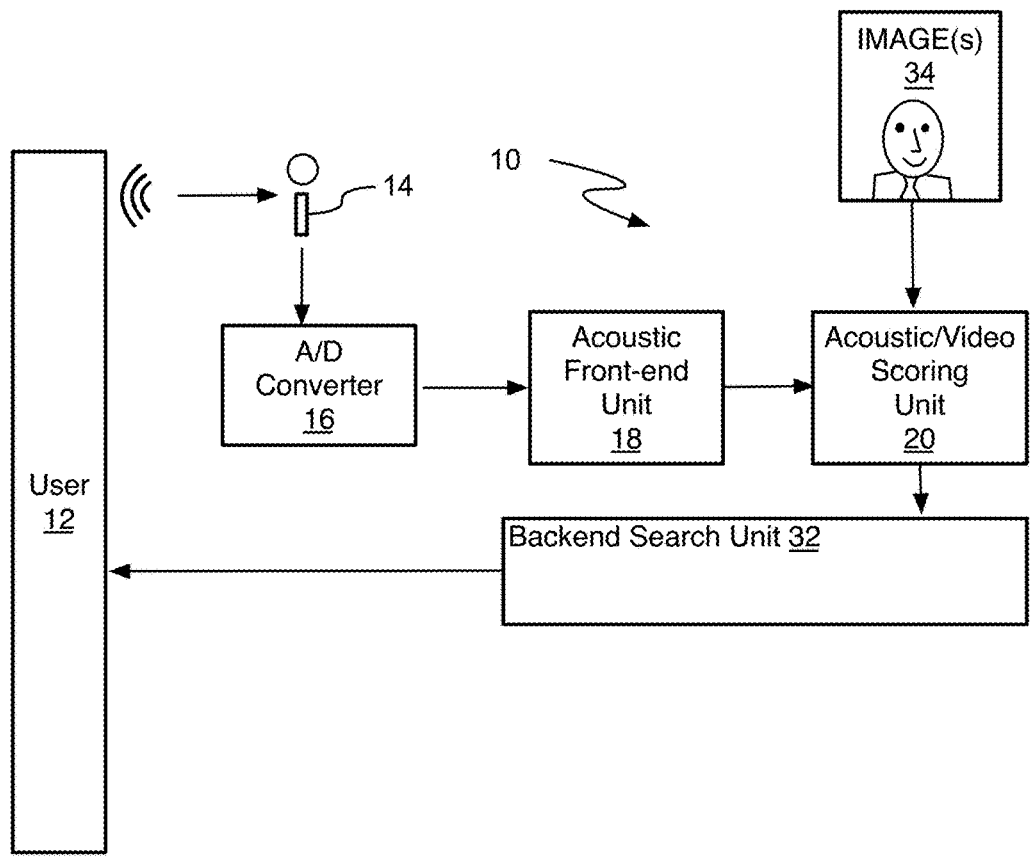
FIG. 1 is an illustrative diagram of an example GMM (Gaussian Mixture Model) system.

While the following description sets forth various implementations that may be manifested in architectures such system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation.

Further, when a particular feature, structure, or characteristic is described in connection with an implementation, it is submitted that it is within the knowledge of one skilled in the art to effect such feature, structure, or characteristic in connection with other implementations whether or not explicitly described herein.

Systems, apparatus, articles, and methods are described below including operations for a dual mode GMM (Gaussian Mixture Model) scoring accelerator for both speech and video data.

As described above, GMM (Gaussian Mixture Model) has many well-known usages including speech recognition and image color density modeling in computer vision. Sometimes a dedicated hardware is provided to accelerate workloads that require high-throughput GMM scoring. Typically such dedicated hardware is specifically designed to handle speech recognition workloads and using speech-specific dedicated hardware to accelerate computer vision tasks is not possible.

GMM workloads in speech processing are fundamentally different than GMM workloads in image color modeling. Speech recognition involves processing relatively small number of samples (100 samples/sec) with large number of Gaussian clusters (thousands). Image color modeling on the other hand requires the processing of very large number of samples or pixels (in the millions) with small number of Gaussian clusters (less than 64).

As will be described in greater detail below, implementations are described herein that propose a dual use GMM scoring accelerator that not only processes GMM scoring of audio signals but can also be adapted to process GMM scoring of images as well. In such implementations, color modeling of images (a fundamental computer vision task) may get at least fifteen times boost in performance in addition to over fifty percent CPU power savings versus a similar open source implementation on a CPU.

These two opposing workloads of speech and video scoring can be handled with a dual use GMM scoring accelerator hardware (HW), based in part on an exchange of Gaussian mean and sample point vectors in the GMM scoring formula, without affecting the score calculation. In some implementations, for speech workloads, HW may be adapted to be capable of scoring small number of samples against large number of Gaussians. Similarly, for image workloads, HW may be adapted to be capable of scoring large number of samples against small number of Gaussians.

Accordingly it may be viable to offload image color density modeling, pixel labeling and image segmentation compute from the CPU/GPU to the Gaussian Mixture Models scoring accelerator (GMM-SA) hardware (HW) block. Instead, using implementations described herein to run vision workloads on a dedicated Gaussian Mixture Models scoring accelerator (GMM-SA) hardware (HW) block may offer a three pronged compute strategy for vision applications. In such an implementation, an application can utilize the power of three concurrent machines (CPU/GPU/GMM-SA HW Block) to achieve higher throughput and efficiency.

Referring to FIG. 1, an example ASR system (or acoustic signal processing engine) 10 that uses a GMM accelerator is described. The ASR system 10, such as a speech enabled human machine interface (HMI), may have an audio capture or receiving device 14, such as a microphone for example, to receive sound waves from a user 12, and that converts the waves into a raw electrical acoustical signal that may be recorded in a memory. The system 10 may have an analog/digital (A/D) converter 16 to convert samples of the raw audio analog signal into a digital acoustic signal and provided to an acoustic front-end unit 18. The acoustic front-end unit 18 may perform pre-processing which may include noise reduction, echo cancelling, beam forming, pre-emphasis filtration to flatten the signal, and/or voice activation detection (VAD) to identify the endpoints of utterances as well as linear prediction, mel-cepstrum, and/or additives such as energy measures, and delta and acceleration coefficients, and other processing operations such as weight functions, feature vector stacking and transformations, dimensionality reduction and normalization. The acoustic front-end unit 18 also may divide the acoustic signal into frames, by 10 ms frames by one example, and extracts acoustic features or feature vectors from the acoustic signal using Fourier transforms and so forth. The feature vector is a numerical representation of the frame or interval of speech input.

An acoustic/video scoring unit (also referred to as an acoustic model scoring or feature scoring unit or scoring block) 20 then determines a probability score for the phonemes that are to be identified, which may include context-dependent phonemes. This may be accomplished by using Gaussian mixture models (GMMs) to determine the scores. The acoustic/video scoring unit 20 may compute scores for sub-phonetic, context dependent units based on the feature vectors. The acoustic/videoscoring unit may use sum-of-weighted-differences-squared (SOWDS) logic and score selection logic. The SOWDS logic and score selection logic may be used to compute or otherwise obtain a GMM score corresponding to individual feature vectors. One example of the logic used to compute the SOWDS for the GMM computations was described in U.S. patent application Ser. No. 13/732,329, filed Dec. 31, 2012, published as U.S. Patent Publication No.: 2014/0188470 on Jul. 3, 2014, which is incorporated herein in its entirety.

The acoustic scores may be provided to the search unit 32, and the search unit 32 may use the acoustic scores as the basis for a search for text corresponding to the acoustic score or sequences of acoustic scores to transform acoustic scores from the acoustic/video scoring unit 20 into final recognized language. The search performed by search unit 32 may include a search of a locally stored language database. Search unit 32 also may initiate a remote search by wirelessly or otherwise transmitting GMM scores to a remotely located search engine. The search unit 32 may generate text output corresponding to the acoustic scores.

In some embodiments, acoustic/video scoring unit 20 may be originally adapted for scoring speech. As will be described in greater detail below, acoustic/video scoring unit 20 may be adapted via middleware and/or redesigned hardware, so that the acoustic/video scoring unit 20 may also score video images 34. As previously discussed GMM workloads in speech processing are fundamentally different than GMM workloads in video (e.g., in image color modeling). Speech recognition involves processing relatively small number of samples (100 samples/sec) with large number of Gaussian clusters (thousands). Video modeling on the other hand requires the processing of very large number of samples or pixels (in the millions) with small number of Gaussian clusters (less than 64). These two opposing workloads of speech and video scoring can be handled with a dual use acoustic/video scoring unit 20, based in part on an exchange of Gaussian mean and sample point vectors in the GMM scoring formula, without affecting the score calculation. In some implementations, for speech workloads, acoustic/video scoring unit 20 may be adapted to be capable of scoring small number of speech samples against large number of Gaussians. Similarly, for video workloads, HW may be adapted to be capable of scoring large number of video samples against small number of Gaussians.

Speech recognition includes scoring small number of sample points (feature vectors) against large number of GMMs. The reverse is true for images, the Gaussian mixture modeling of image color involves scoring a large number of sample points (color pixels) against small number of Gaussians. Comparing speech & image sample points, speech sample points fall in the range of 100 samples per second. Whereas image sample points fall in the range of around a million samples. Speech recognition needs thousands of Gaussians in the mixture model whereas image color modeling is good with less than 64 Gaussians in the mixture model. Using an unmodified HW block that allows scoring of only 8 sample points at a time with the Gaussians is not suitable for usage with image sample points, as with images there are typically millions of samples. Accordingly, using an unmodified HW block to process image data as is will not lead to speed improvement.

Accordingly, in some implementations a dual use Gaussian Mixture Models scoring accelerator (GMM-SA) hardware (HW) block may be provided that accelerates both speech recognition and image color modeling. Such a dual use Gaussian Mixture Models scoring accelerator (GMM-SA) might involve redesigning the hardware (HW) to accelerate both speech recognition and image color modeling. Alternatively, a dual use Gaussian Mixture Models scoring accelerator (GMM-SA) might involve operating the hardware (HW) in an unusual way with the help of an additional middleware. Additional details regarding such a dual use Gaussian Mixture Models scoring accelerator (GMM-SA) may be described below with regard to FIG. 2.

Figure 2:
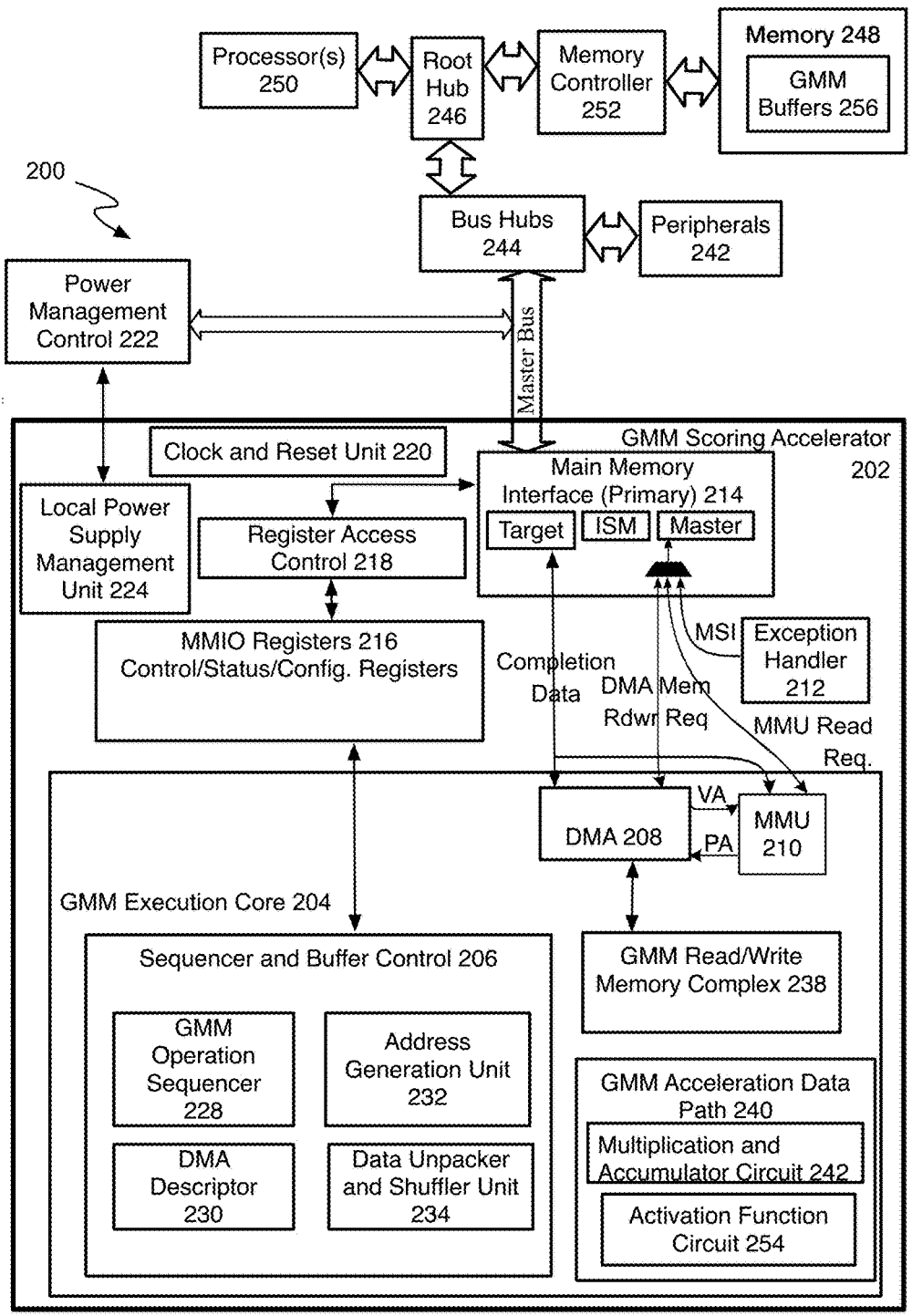
FIG. 2 is an illustrative diagram of an example GMM (Gaussian Mixture Model) system.

FIG. 2 is an illustrative diagram of an example GMM system 200, arranged in accordance with at least some implementations of the present disclosure. In one example, GMM system 200 may be a system on a chip (SoC) that has a GMM Scorring Accelerator 202. Such a GMM system 200 may be formed as a module and uses high-speed serial computer expansion bus standards such as a peripheral component interconnect express (PCIe) environment. While the GMM Scorring Accelerator 202 illustrated here is shown as an integrated product, it will be appreciated that non-integrated implementations also might be used in at least some implementations of the present disclosure.

As used herein, the term scoring (e.g., as might be done via GMM Scorring Accelerator 202) may refer to Gaussian Mixture Model (GMM)-type operations, or other operations such as calculating the output of a neural network in the GMM. Accordingly, it will be understood that while many components are described herein as "GMM"-type units, these units may equally be similarly described as being configured for operation on another type of scoring operation, such as Affine Neural Network, Diagonal Matrix multiplication, Recurrent Neural Networks, Copy Operations, the like, and/or combinations thereof.

The GMM system 200 may have at least one processor 250 which may include co-processors, multiple processor cores, and one or more processor caches. The processor 250 may process instructions and may send data to, and receive data from, a volatile memory 248 which may be on-board, on-die or on-chip relative to the SoC, and may be RAM such as DRAM or SRAM and so forth. The processor 250 may control data flow with the memory 248 via a memory controller 252 and root hub 246. The processor 250 also may have data transmitted between the memory 248 and other components on the GMM Scoring Accelerator 202 as described below. Otherwise, the processor 250 may retrieve or transmit data to other external (off-die or off-chip) volatile memory (such as cache and/or RAM) or non-volatile memory whether as memory 248 or another memory communicating through the root hub and/or other bus hubs. The root hub 246 communicates with bus hubs 244 that provide communication with many different types of peripherals 242 as well as the GMM Scoring Accelerator 202. The external memory 248 may be referred to as the more external memory (or just external memory) relative to internal or local memory buffers.

Turning to the GMM Scoring Accelerator 202, the GMM Scoring Accelerator 202 may have a DMA (Direct Memory Access) unit (or engine or just DMA) 208, memory management unit (MMU) 210, exception handler 212, and main memory interface 214 to move data among more external memory 248 and the other memories on the GMM Scoring Accelerator 202. The DMA 208 performs data read/write operations while the MMU 210 assists with addressing the data in the memory and buffers so that paging schemes or other similar memory capacity and time saving techniques can be used. The DMA engine(s) 208 may be used to monitor the fullness of internal buffers of GMM read/write memory complex 238 and control the rate of obtaining data from the buffers 256 in external memory 248 for placement into the internal buffers 238 depending on the fullness of the internal buffers of GMM read/write memory complex 238. The exception handler (or interrupt generation logic) 212 is provided for smooth and efficient operation by informing the host processor(s) 250 that the operation has finished and is ready for implementation of next steps when an GMM Acceleration data path 240 stops execution. Power consumption can be reduced by incorporating the DMA 208 and the MMU 210 by allowing independent operation of memory transactions while the application processor is asleep or performing other tasks for example. The details of these DMA, memory, and buffer operations are disclosed by U.S. patent application Ser. No.: 14/722,489, filed May 27, 2015, which is incorporated herein in its entirety for all purposes.

The GMM Scoring Accelerator 202 also may have memory mapped input output (MMIO) registers 216 that may provide control, status, and configuration registers that hold the data indicating settings and parameters. The processor(s) 250 may initiate the processing of the GMM by having the DMA 208 place data from external memory 248 into the MIMO registers 216. The MIMO registers 216 may be controlled by a register access control 218.

The GMM Scoring Accelerator 202 also may have a sequencer and buffer control 206, as well as the GMM read/write memory complex 238 and the data path 240, which generally and collectively may be referred to as an GMM execution core 204 along with the DMA 208 and MMU 210 since these components can be considered active components that perform the main operations for scoring and may be run as a single power domain on the GMM Scoring Accelerator 202. The sequencer and buffer control 206 has a GMM operation sequencer 228, GMM operation sequencer 230, address generation unit 232, and data unpacker and shuffler unit 234. The GM operation sequencer 228 manages the data flow among the memories, registers, and the path way 240. Gaussian mixture model (GMM) operation sequencer 228 reads the configuration, status, and control data from the MIMO registers 216. The GMM operation sequencer 228 arranges retrieval of inputs, variances and mean values to be placed into the path way 240 to obtain a best score.

To accomplish these tasks, the DMA Descriptor 230 informs the DMA 208 which data to obtain, and when to obtain the data.

The data unpacker and shuffler unit 234 is provided to unpack data retrieved from the external memory 248 or other memory, and when that data is received in a format that is not compatible with the path way 240 such that the data needs to be placed in a certain order or format into the internal buffers of GMM read/write memory complex 238. A shuffler portion of the unit 234 directs input data from an input buffer at internal buffer of GMM read/write memory complex 238 to the pathway 240. This may occur over a number of iterations where input values of an input array can be held in an input buffer in the internal buffer of GMM read/write memory complex 238 and the input array can be re-used to compute different sums or outputs, and the shuffler can direct the input values to the correct place on the receptacles of the path way 240 for each iteration.

The GMM Acceleration data path 240 has a multiplication accumulator circuit (MAC) 242, and also may have an activation function circuit 254 that receives sums (or sum outputs), and by one form, a sum of weighted inputs, from the MAC 242 and provides a final output by applying an activation function. The MAC 242 provides fixed function hardware parallel logic blocks that each compute a weighted input value that is provided to an accumulator to compute a sum of the weighted inputs to form a single output. For example, GMM acceleration data path 240 is configured to define the score operation as a mathematical function that is implemented using parallel logic. As will be described in greater detail below, mixture component mean vectors (e.g. Mean), variance vectors (e.g. Var), Gaussian constants (e.g., Gconst), and/or feature vectors may be streamed in and GMM scores are streamed out of GMM acceleration data path 240.

A clock and reset unit 220 provides the clock for the GMM Scoring Accelerator 202 and may provide signals to control the timing of the circuit logic flow during operation. A local power supply and management unit 224 also may be provided on the GMM Scoring Accelerator 202 to control power domains on the GMM Scoring Accelerator 202 and may itself be controlled and/or communicate with a power management control 222 external to the GMM Scoring Accelerator 202 but still on the system 200 by one example. The power management unit 224 and control 222 may control the opening and closing of power gates and switches on the system 200.

The Gaussian Mixture Model scoring accelerator (GMM-SA) 202 may be a low power, high performance coprocessor. The GMM-SA 202 may be capable of evaluating millions of Gaussian probability density functions per second without polluting the CPU caches. As will be described in greater detail below, in some implementations, it may be possible to use GMM-SA HW 202 that is specifically designed for speech modeling for image modeling.

In the current art, there appears to be no dedicated hardware that accelerates GMM scoring for both speech and image model scoring workloads. For example, existing Gaussian Mixture Models scoring accelerator (GMM-SA) hardware (HW) might already be specifically designed to accelerate speech recognition with the capacity of scoring 8 samples against 262,144 Gaussians at a time. Using this Gaussian Mixture Models scoring accelerator (GMM-SA) hardware (HW) for speech improvement on image color modeling problem is not possible given that, image workloads include millions of sample points.

Accordingly, in some implementations a dual use Gaussian Mixture Models scoring accelerator (GMM-SA) 202 hardware (HW) block may be provided that accelerates both speech recognition and image color modeling. Such a dual use Gaussian Mixture Models scoring accelerator (GMM-SA) 202 might be involve redesigning the hardware (HW) to accelerate both speech recognition and image color modeling.

Accordingly it may be viable to offload image color density modeling, pixel labeling and image segmentation compute from the CPU/GPU to the Gaussian Mixture Models scoring accelerator (GMM-SA) 202 hardware (HW) block. Instead, using implementations described herein to run vision workloads on a dedicated Gaussian Mixture Models scoring accelerator (GMM-SA) 202 hardware (HW) block may offer a three pronged compute strategy for vision applications. In such an implementation, an application can utilize the power of three concurrent machines (CPU/GPU/GMM-SA HW Block) to achieve higher throughput and efficiency.

Alternatively, a dual use Gaussian Mixture Models scoring accelerator (GMM-SA) 202 might be involve operating the hardware (HW) in an unusual way with the help of an additional middleware. For example, by using the additional middleware, existing speech specific HW can be used to handle image workloads and achieve speedup over a popular CPU-based implementation. In a recent experiment, performance benefits (three times speed up) on image color density modeling was achieved using a speech specific HW block that accelerates both speech recognition and image color modeling with the help of an additional middleware that uses the HW in an unusual way. In such operations, the fixed-point processing capability offered by the GMM-SA 202 does not affect quality of the solution for the image color density modelling problem. Further, much higher speedup (e.g., at least fifteen times) can be achieved with a change in GMM-SA 202 HW through microcode, transforming this piece of HW to become a dual use GMM scoring accelerator 202 HW.

In some implementations, GMM-SA 202 HW may be designed with speech recognition applications in mind (e.g., specifically to decrease latency and lower the power) and adapted via middleware to process image data. GMM-SA 202 HW may have the capacity to handle a large number of Gaussian mixture models-up to 262,144 GMMs with up to 4,096 mixture components each, for example. In such an implementation, GMM-SA 202 HW may score up to 8 sample points at a time against the set of GMMs (max 262,144). In such an implementation, the sample point dimension (e.g., vector size) may be between 24 and 96 and a multiple of 8. Each sample point vector element may be a 1 byte unsigned integer. In the case of color in images sample point vector may be 3 dimensional (e.g., R, G & B). Each of these dimensions may need to also be 1 byte to be compatible with the GMM-SA HW. In some examples, 24 dimensional sample point vectors may be used for color modeling. The first three vector elements are R, G & B, and the other 21 may be set to zero. In some examples, mean vector elements may be 1 byte and inverse covariance vector elements may be 1 or 2 bytes. In some examples, the dimension of the mean and inverse covariance vectors may be in the range of 24 to 96 and may need to be a multiple of 8.

Further, system 200 and GMM Scoring Accelerator 202 may include additional items that have not been shown in FIG. 2 for the sake of clarity.

Figure 3:
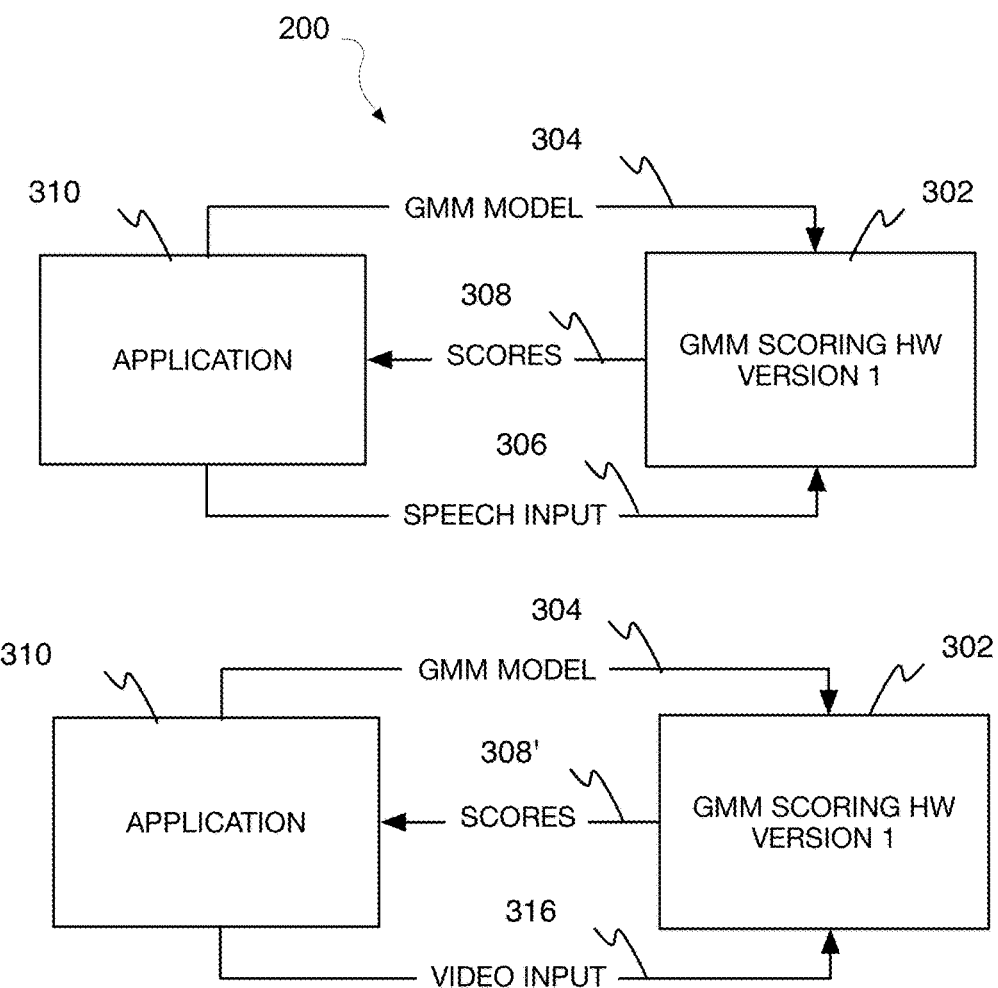
FIG. 3 is an illustrative diagram of operation of an example GMM (Gaussian Mixture Model) scheme.

FIG. 3 is an illustrative diagram of an example GMM system 200 implemented via dual use GMM hardware (HW), arranged in accordance with at least some implementations of the present disclosure. As discussed above, different implementations of dual use GMM HW is possible. Dual use can be made possible either through a HW that can handle both speech and video input or through a software (SW) Middleware combined with a HW that is designed to handle only one type of input.

In the illustrated example, GMM system 200, implemented via dual use GMM hardware (HW), handles speech and video input. Here, version 1 of GMM Scoring HW 302 is used and it can handle both speech and video input. For speech, given GMM model parameters 304 (means, co-variances and constants) and speech input 306, this HW 302 calculates and outputs the speech scores that can be directly used by the application 310. For images, given GMM model parameters 304 (means, co-variances and constants) and video input 316, this HW 302 calculates and outputs the speech scores that can be directly used by the application 310.

The functionality of the dual use GMM hardware (HW) can be better illustrated by similar operations performed by the alternative implementation via middleware software (SW), as illustrated below in FIG. 4. Accordingly, dual use GMM hardware (HW) implementation illustrated in FIG. 3 performs the same or similar functions to that described below with regard to the middleware software (SW) implementation illustrated in FIG. 4.

Figure 4:
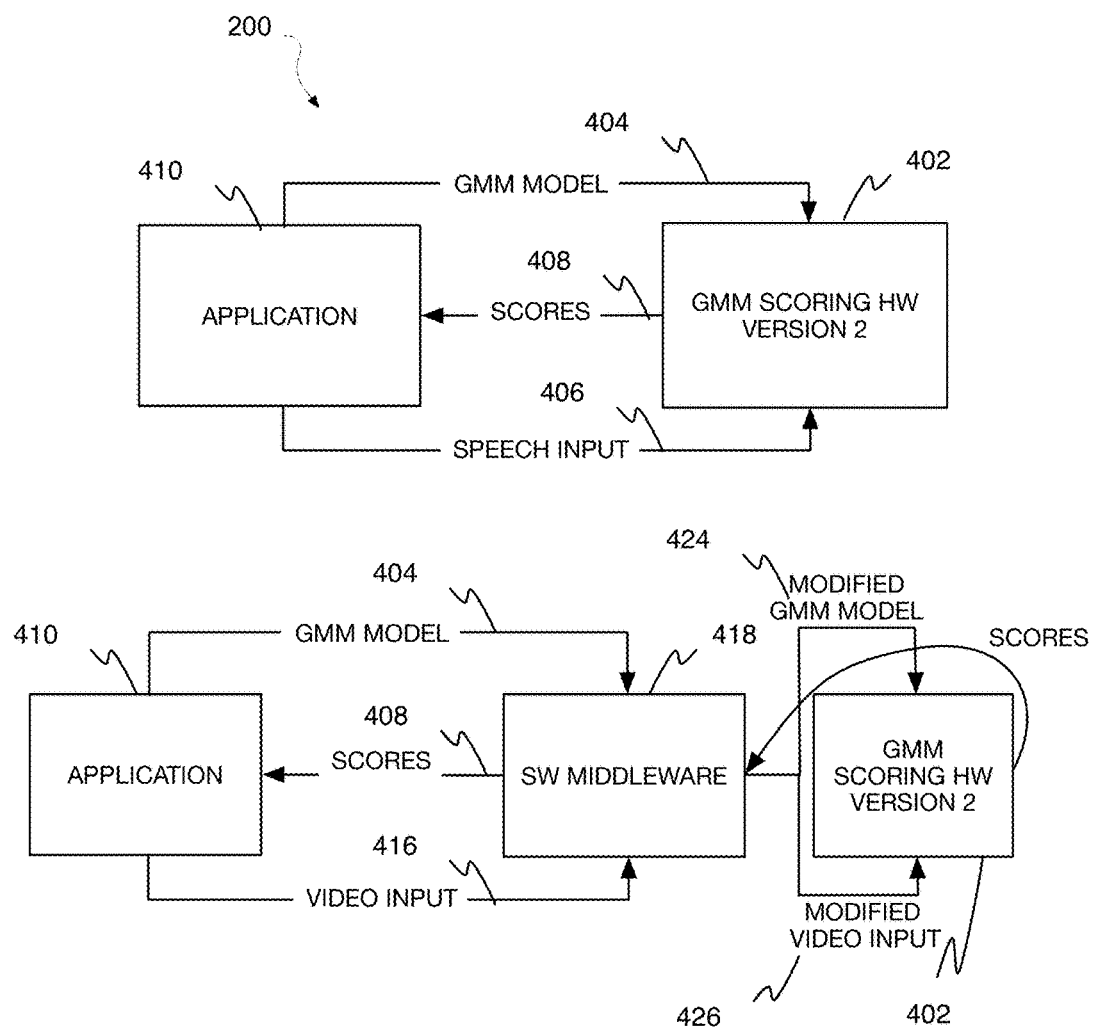
FIG. 4 is an illustrative diagram of operation of an example GMM (Gaussian Mixture Model) scheme.

FIG. 4 is an illustrative diagram of an example GMM system 200 implemented via single use GMM hardware (HW) 402 adapted with a dual use middleware software (SW) 418, arranged in accordance with at least some implementations of the present disclosure. As discussed above, different implementations of dual use GMM HW is possible. Dual use can be made possible either through a HW that can handle both speech and video input or through a SW Middleware combined with a HW that is designed to handle only one type of input.

In the illustrated implementation, a single use version of GMM scoring HW 402, which is primarily designed to handle speech inputs, may be adapted for dual use via middleware software (SW) 418. Here, version 2 of GMM Scoring HW 402 is used and it can handle only one of speech and video input (illustrated here as being designed for speech input, for example). For speech, given GMM model parameters 404 (means, co-variances and constants) and speech input 406, this version 2 of GMM Scoring HW 402 calculates and outputs the speech scores that can be directly used by the application 410. For images, given GMM model parameters 404 (means, co-variances and constants) and video input 416, the middleware software (SW) 418 modifies the GMM model parameters 424 and modifies the video input 426 so that version 2 of GMM Scoring HW 402 is able to exchange buffer usage to calculate and outputs the speech scores that can be directly used by the application 410. In the illustrated example, buffers (e.g., see GMM buffer 256 of FIG. 2) intended for speech input 406 may be used for the modified GMM model parameters 424 (e.g., specifically, for the purpose of storing the means parameter), while buffers (e.g., see GMM buffer 256 of FIG. 2) intended for GMM model parameters 404 may be used for the video input 416 (e.g., specifically, part of the buffer that is supposed to store means is used to store the video input). In order to handle video inputs with efficiency, a SW Middleware 418, modifies the inputted GMM model, modifies the video input, and reinterprets the scores calculated by the scoring HW to account for the modifications to the GMM model and video input.

Additional details regarding the operation of FIG. 4 can be found below with regard to FIG. 5.

Figure 5:
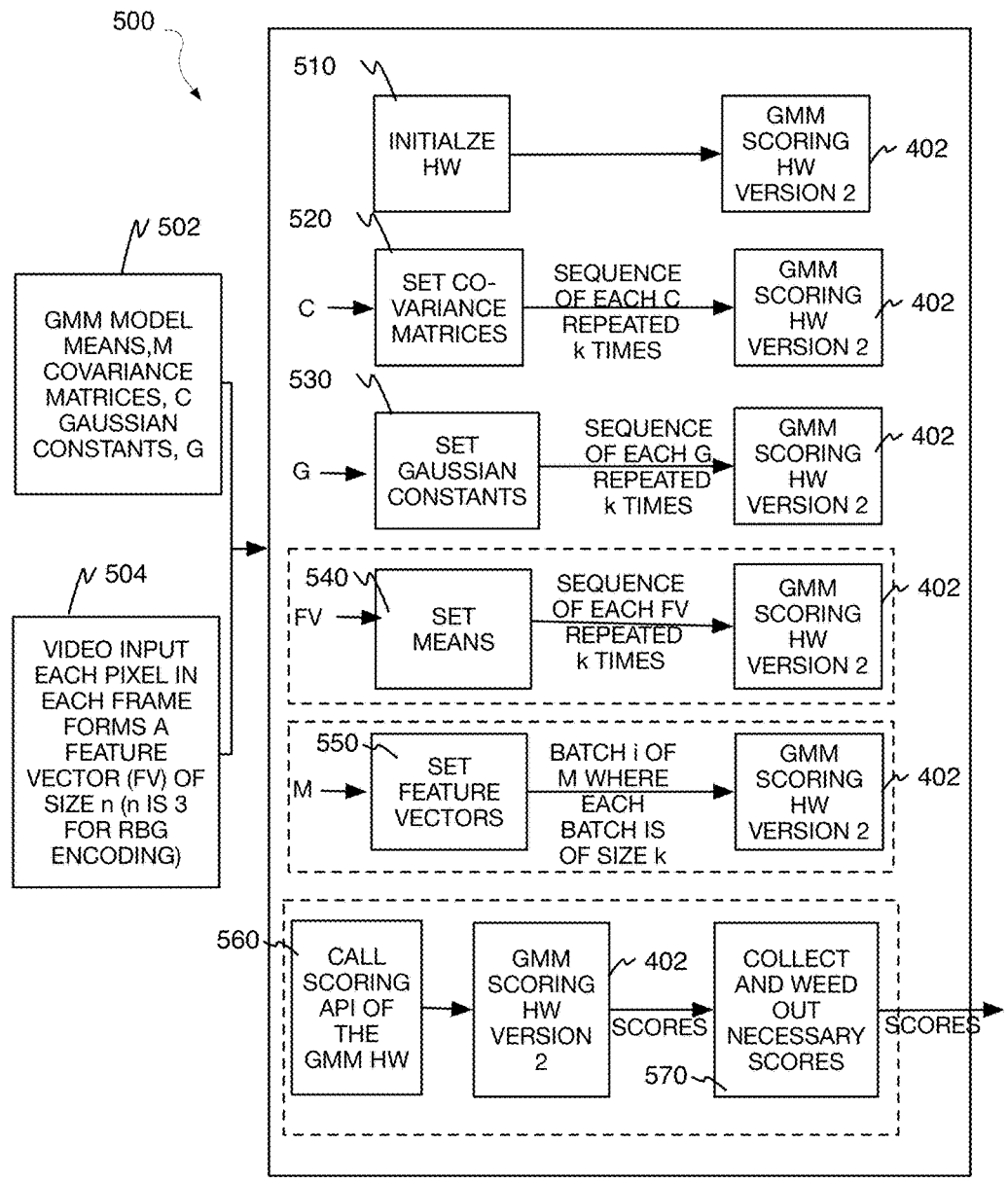
FIG. 5 is a flow chart illustrating an example scoring process.

FIG. 5 is an illustrative diagram of an example dual use scoring process 500 implemented via single use GMM hardware (HW) 402 adapted with a dual use middleware software (SW) 418, arranged in accordance with at least some implementations of the present disclosure. As discussed above, different implementations of dual use GMM HW is possible. Dual use can be made possible either through a HW that can handle both speech and video input or through a SW Middleware combined with a HW that is designed to handle only one type of input. Please note that the same and/or similar functionality as dual use middleware software (SW) 418 may be directly implemented in dual use GMM hardware, as discussed above with regard to FIG. 3.

FIG. 5 shows details of dual use SW Middleware that makes single use GMM scoring HW 402 (e.g., version 2 illustrated in FIG. 4) able to handle video inputs with efficiency. Operations that are carried by this middleware can be followed top to bottom in FIG. 5.

At operation 510 "INITIALIZE HW", GMM scoring HW 402 may be initialized. Initialization may include allocating necessary memory to hold inputted GMM model parameters 502, video input (or speech input) 504 and outputted scores.

As used herein the term "M" or "Mean[s]" may refer to a Mean value. The Mean may be indicated as M[m,n] with m being the number of mixtures in each state and n being the number of elements in the feature vector. This structure may be repeated for each GMM state. For example, the Mean may be a 2-D array, which includes an element for each vector (first index) and a row for each mixture component (second index). This may be denoted as Mean[m,n]. The size of each element in the mean vector may be defined by Mean Vector Width in byte (e.g., in the MVWIDTH register).

As used herein the term "C" or "Var[s]" may refer to an inverse covariance. The Var may be indicated as V[m,n] with same or similar syntax as the Mean. The Inverse Var (denoted as Var) may be a 2-D array, which may include an element for each vector (first index) and a row for each mixture component (second index). This is denoted as Var[m,n]. The size of each element in the mean vector may be defined by Variance Vector Width in byte in the VVWIDTH register.

As used herein the term "G" or "Gconst" may refer to a Gaussian Constant. The Gconst may be denoted as W[m] with m being the number of mixtures in each state. For example, the Gconst may be a 1-D array, which may include an element for each mixture component in the state.

As used herein the term "FV" may refer to some portion of the data (referred to herein as a "Feature Vector") that may be re-used during the operation, being read at the beginning and then re-used from a buffer within the module. Such a feature vector may hold a set of values for each audio frame (or image frames); these are the input data that are being evaluated. For example, the GMM feature vector array may include a 1-D array for speech input for each feature vector and a 3-D array for image input, denoted as FV[n].

As used herein the term "Score" may refer to a GMM Score (GScore). Such a Score may hold the result of the scoring, per each of the feature vectors, and the mixture components. The GMM score may be the output of the GMM operation. A one score number may be saved for each GMM state and feature vector. The scores may be stored in the order of GMM stage execution.

In some implementations, during the initialization following constants are calculated:

The number of pixels that can be scored at a time against the Gaussians in the mixture model is given by:

$$\text{max\_pixels} = \frac{\text{max\_gmms}}{k}$$

where max_gmms for GMM-SA is 262,144 and k is the grouping factor for GMM-SA which is between 1 and 8. The parameter k may be set by the application developer. Smaller k values would allow bigger number of pixels to be scored with one API call to the HW, but higher k values would be preferable for better performance.

The end goal is to calculate scores for each pixel. If scoring can only happen in batches of max_pixels, the number of scoring rounds that needs to take place is given by:

$$\text{outer\_scoring\_rounds} = \frac{\text{number of pixels}}{\text{max\_pixels}}$$

To calculate the score for a pixel, we need to calculate individual scores of M Gaussians against the pixel. Given that k Gaussians can be scored at a time and there are M number of Gaussians, the number of scoring rounds that should be performed is given by:

$$\text{inner\_scoring\_rounds} = \text{ceiling}\left(\frac{M}{k}\right)$$

At operation 520 "SET CO-VARIANCE MATRICES", the co-variance matrices C may be set for GMM scoring HW 402. For example, a sequence of each co-variance matrices C may be repeated k times.

In some implementations, when covariance matrix C is assumed to be diagonal, there is one variance associated with each mean. So, if there are M means, then there are M variances and M Gaussian constants. SW Middleware sets covariance matrix in the HW memory such that for each inner_scoring_rounds, batches of variances of size k is inputted in a way that each batch is repeated max_pixels times. For the first batch of variances, following sequence will be inputted:

$$\underbrace{C_0, C_1, \ldots, C_k,\quad C_0, C_1, \ldots, C_k, \ldots,\quad C_0, C_1, \ldots, C_k}_{\text{Repeat 1,}\qquad \text{Repeat 2, }\ldots,\qquad \text{Repeat max\_pixels}}$$

At operation 530 "SET GAUSIAN CONSTANTS", the Gaussian constants G may be set for GMM scoring HW 402. For example, a sequence of each Gaussian constants G may be repeated k times.

In some implementations, Gaussian constants are inputted in the same way as the variances. SW Middleware sets Gaussian constants in the HW memory such that for each inner_scoring_rounds, batches of constants of size k is inputted in a way that each batch is repeated max_pixels times.

At operation 540 "SET MEAN", the GMM model means M may be set for GMM scoring HW 402. As will be described in greater detail below, in some implementations, GMM model means M and feature vectors may be flipped in order to efficiently use the available HW with video inputs. Accordingly, feature vectors FV may be inputted as Gausian means M if the data type being processed is switching between speech and video. This means that we write mean vectors in the HW buffer where feature vectors are supposed to be stored and vice versa.

In some implementations, feature vectors FV may be inputted as means in a way that each feature vector is repeated k times. If there are more feature vectors than max_pixels, then we input them in batches. The total number of batches used is given above as outer_scoring_rounds. For the first batch of the feature vectors, following sequence will be inputted:

$$\underbrace{FV_0, FV_0, \ldots, FV_0, FV_1, FV_1, \ldots, FV_1, \ldots,}_{\text{Repeated } k \text{ times}}$$

$$FV_{\text{max\_pixels}}, FV_{\text{max\_pixels}}, \ldots, FV_{\text{max\_pixels}}$$

At operation 550 "SET FEATURE VECTOR", the feature vector FV may be set for GMM scoring HW 402. As will be described in greater detail below, in some implementations, GMM model means M and feature vectors may be flipped in order to efficiently use the available HW with video inputs. Accordingly, Gaussian means M may be inputted as feature vectors FV if the data type being processed is switching between speech and video. This means that we write mean vectors in the HW buffer where feature vectors are supposed to be stored and vice versa.

In some implementations, if there are more GMM model means M than k, then we input them in batches. The total number of batches i used is given above as inner_scoring_rounds.

At operation 560 "CALL SCORING API OF THE GMM HW", a scoring API of the GMM scoring HW 402 may be called. In some implementations, once GMM model parameters and feature vectors FV are inputted, SW Middleware may make a scoring call to the GMM Scoring HW 402. GMM scoring HW 402 may then score the feature vectors FV and GMM model means M.

At operation 570 "COLLECT AND WEED OUT NECESSARY SCORES", Received scores from GMM scoring HW 402 may need to be post-processed to weed out necessary scores. For example, received scores may need to be post-processed as we may receive max_pixels*k*k scores and may only need max_pixels*k scores.

Additional details regarding such weeding operations can be found below with reference to FIG. 7, which shows how the weeding out occurs to get to the relevant scores.

GMM-SA HW is often designed with speech recognition applications in mind, specifically to decrease latency and lower the power. In some embodiments herein, the GMM-SA HW utilized include the following characteristics: 1) the capacity to handle a large number of Gaussian mixture models—up to 262,144 GMMs with up to 4,096 mixture components each; 2) scoring up to 8 sample points at a time against the set of GMMs (max 262144); 3) the sample point dimension (e.g., vector size) may typically be between 24 and 96 and a multiple of 8; 4) each sample point vector element may typically be a 1 byte unsigned integer; 5) mean vector elements are 1 byte and inverse covariance vector elements may be 1 or 2 bytes; and 6) the dimension of the mean and inverse covariance vectors may typically be in the range of 24 to 96 and may need to be a multiple of 8.

Additionally, for image data, in the case of color in images sample point vector is 3 dimensional (i.e., R, G & B). Each of these dimensions needs to be 1 byte to be compatible with the GMM-SA HW. In this prototype we use 24 dimensional sample point vectors for color modeling. The first three vector elements are R, G & B, and the other 21 are set to zero.

Speech recognition includes scoring small number of sample points (feature vectors) against large number of GMMs. The reverse is true for images, the Gaussian mixture modeling of image color involves scoring a large number of sample points (color pixels) against small number of Gaussians. Comparing speech & image sample points, speech sample points fall in the range of 100 samples per second. Whereas image sample points fall in the range of around a million samples. Speech recognition needs thousands of Gaussians in the mixture model whereas image color modeling is good with less than 64 Gaussians in the mixture model. Using an unmodified HW block that allows scoring of only 8 sample points at a time with the Gaussians is not suitable for usage with image sample points, as with images there are typically millions of samples. Accordingly, using an unmodified HW block to process image data as is will not lead to speed improvement.

The GMM-SA may implement a common approximation to the Gaussian mixture probability density function (pdf) given by equation (1).

$$f(x) = \sum_{m=1}^{M} \omega_m \frac{1}{\sqrt{(2\pi)^K |\Sigma_m|}} e^{-\frac{1}{2}(x-\mu_m)^T \Sigma_m^{-1}(x-\mu_m)} \quad (1)$$

By defining $$\phi_m \equiv \omega_m \frac{1}{\sqrt{(2\pi)^K |\Sigma_m|}} \text{ and } C_m \equiv \frac{1}{2}\Sigma_m^{-1}$$

the expression is simplified to:

$$f(x) = \sum_{m=1}^{M} \phi_m e^{-(x-\mu_m)^T C_m (x-\mu_m)} \quad (2)$$

Several simplifications may be made. First, instead of computing f(x) directly, the negative log of f(x) is computed instead. Second, the covariance matrices $\Sigma_m$ are assumed to be diagonal (and the sample vectors may have been de-correlated if necessary to ensure this). Third, the value of the negative log of f(x) is approximated by the value of the mixture component with the highest likelihood. So the equation implemented by GMM-SA is that of equation (3).

$$\log f(x) \approx \text{MAX}_{m=1}^{M} \left\{ \log \phi_m - \sum_{k=1}^{K} C_m(k,k)(x(k) - \mu_m(k))^2 \right\} \quad (3)$$

Here, $\phi_m$ is the combined Gaussian constant and mixture weight, $C_m(k,k)$ is an element of the diagonal inverse covariance vector, $x(k)$ is an element of the sample point (feature vector), and $\mu_m(k)$ is an element of the mean vector.

The output of GMM-SA is the negative log of the Gaussian mixture pdf. One can observe that means (Gaussians) and feature vectors (sample points) components can be interchanged such that the single Gaussian mixture score remains unaffected. This observation allowed us to come up with a GMM buffer design where feature vectors (sample points) are stored as Gaussian means and Gaussian means are stored as feature vectors (sample points). This innovative design allows the scoring of 32768 pixels aka feature vectors or sample points against 8 Gaussian mixtures of the GMM model with one GMM-SA API call. Multiple scoring calls can be done to accommodate bigger GMM models as a typical image color density model contains 8 to 32 mixtures. The number of pixels that can be scored at a time with the Gaussians in the mixture model is given by:

$$\text{max\_pixels} = \frac{\text{max\_gmms}}{k}$$

Where max_gmms for GMM-SA is 262,144 and k is the grouping factor for GMM-SA which is between 1 and 8.

Figure 6:
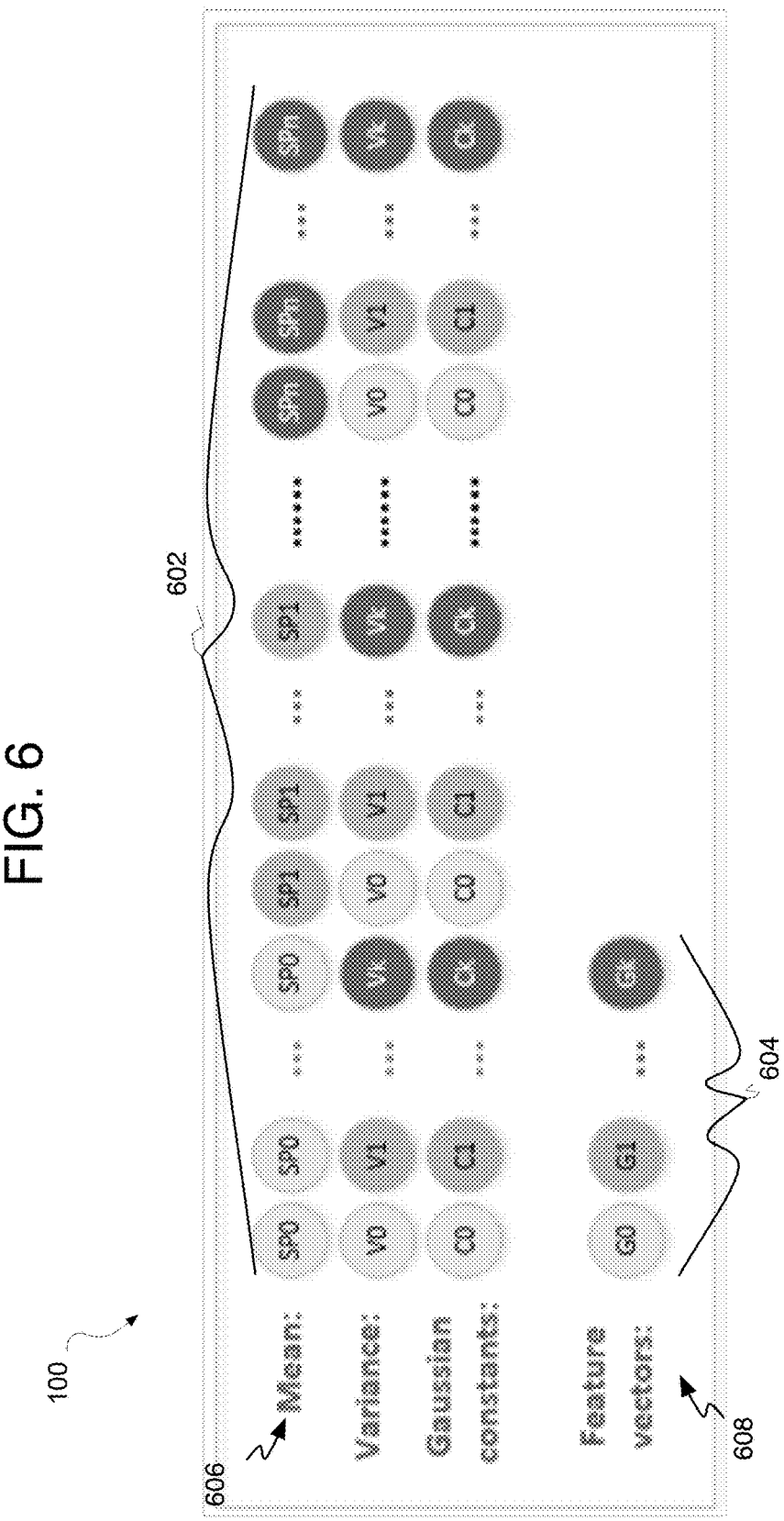
FIG. 6 is an illustrative diagram of an example buffer configuration.

FIG. 6 is an illustrative diagram of an example buffer configuration 600, arranged in accordance with at least some implementations of the present disclosure. In the illustrated example, in some implementations, GMM model means (illustrated here as "(G0 . . . Gk)") 604 and feature vectors sample points (illustrated here as "(SP0 . . . SPn)") 602 may be flipped in order to efficiently use the available HW with video inputs. Accordingly, Gausian means (G0 . . . Gk) 604 may be inputted as if they were feature vectors sample points if the data type being processed is switching between speech and video. Similarly, feature vector sample points (SP0 . . . SPn) 602 may be inputted as if they were Gausian means. This means that we write mean vectors in the HW buffer where feature vectors are supposed to be stored and vice versa.

In the illustrated example, feature vector sample points (SP0 . . . SPn) 602 may be stored in a GMM mean buffer section 604 normally intended for storing GMM means. Similarly, GMM means (G0 . . . Gk) 606 may be stored in a feature vector buffer 608 normally intended for storing feature vector sample points.

In operation, data is exchanged between an application and the GMM-SA HW through a buffer allocated by the application. Applications use the GMM buffer to hold the Gaussian model components in the format expected by the GMM-SA HW. Gaussian model components consists of means, variances and Gaussian constant arrays. In addition to Gaussian model components, applications use the GMM buffer to store feature vectors. GMM-SA HW uses the GMM buffer to write scores when calculated.

As mentioned before, in some implementations, for the purpose of image color density modeling, we will be storing our means as feature vectors and our feature vectors as means. FIG. 6 shows the buffer design adapted for this specific usage. In FIG. 6, the labels on the left refer to where these arrays will be stored in the GMM buffer. $SP_0$, $SP_1 \ldots SP_n$ are the sample points, which are 3 dimensional color pixels. Each sample point is repeated k times to facilitate the scoring with each Gaussian model. $V_0, V_1 \ldots V_k$ and $C_0, C_1 \ldots C_k$ are the variance and Gaussian constant vectors, respectively. These vectors are repeated n times to facilitate the scoring with n sample points. We store k number of Gaussian means, $G_0, G_1 \ldots G_k$, in the feature vectors array. The grouping factor k should be between 1 and 8 due to the GMM-SA HW restrictions. Given that M number of Gaussians are used for image color density modeling, the number of inner scoring rounds that should be performed is given by:

inner_scoring_rounds=ceiling(M/k)

As given buffer design may produce k*n*k scores at each scoring round as each feature vector is scored against each Gaussian model, which is comprised of mean, variance and Gaussian constant vectors.

Figure 7:
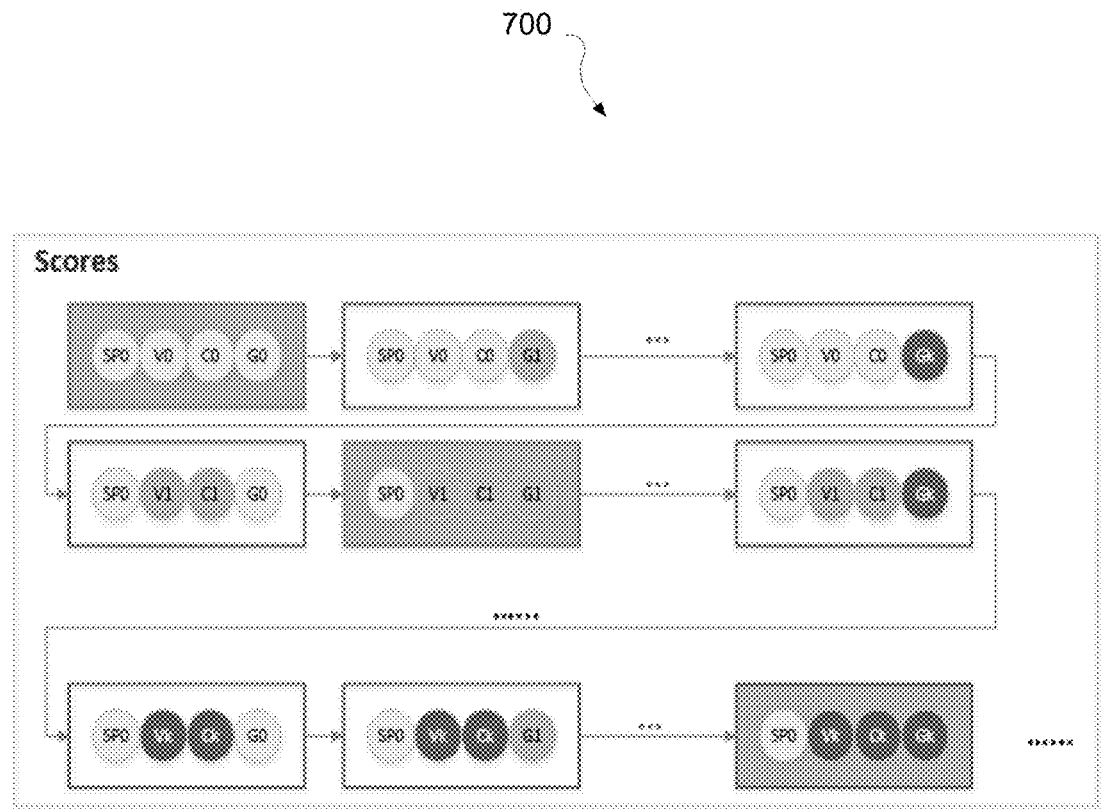
FIG. 7 is an illustrative diagram of an example score result.

FIG. 7 is an illustrative diagram of an example score result 700, arranged in accordance with at least some implementations of the present disclosure. In the illustrated example, score result 700 illustrates how the scoring vector looks like after one scoring round. Each box stands for a single score and shows the feature vector (SP0) and the Gaussian model components that are used to compute the score. In this design, result of only some score calculations are used for the final labeling task, which are shown as shaded boxes in FIG. 7. The score vectors generated by GMM-SA HW may be weeded for necessary scores by skipping k scores in between each useful score read. After M Gaussian model scores are collected for each sample point (through multiple scoring rounds, if needed), we find the Gaussian model that scored maximum and label sample points accordingly. We have M labels that correspond to M Gaussian models.

Typical Expectation Maximization (EM)-based training for GMM generates a Gaussian model where means, variances and Gaussian constants are represented as floating point numbers. OpenCV 3.0 EM training may be used to train the initial GMM.

In some implementations, GMM-SA HW may only supports 1 byte means, variances and features; therefore, a scaling operation may be applied over the Gaussian model components generated from the EM training. Training may produce floating point numbers as mentioned above. Due to scaling from floating point to 8 bits the number of possible values of the Gaussian components is significantly decreased; hence, it is possible that this may have a negative effect on the prediction from the GMM-SA HW. But as our experimental results demonstrate with side by side comparisons of GMM modeled images from openCV 3.0 GMM compared with an embodiment of one proposed GMM-SA HW the quality of HW predictions remained intact.

Experimental results using one current design of one proposed GMM-SA HW will be discussed in greater detail below. The proposed GMM-SA HW utilized for FIGS. 8-15 is a single use speech specific GMM-SA HW modified via a middleware implementation of a dual mode module, as illustrated in FIG. 4 above.

Figure 8:
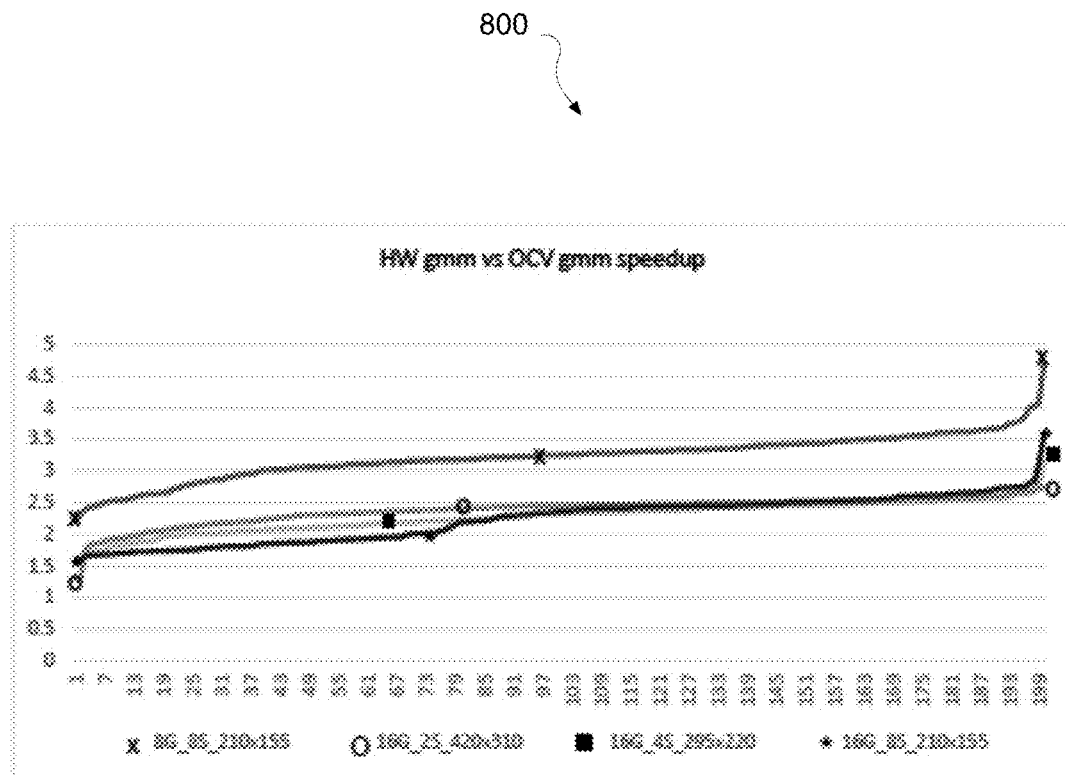
FIG. 8 illustrates an example chart of experimental results.
Figure 9:
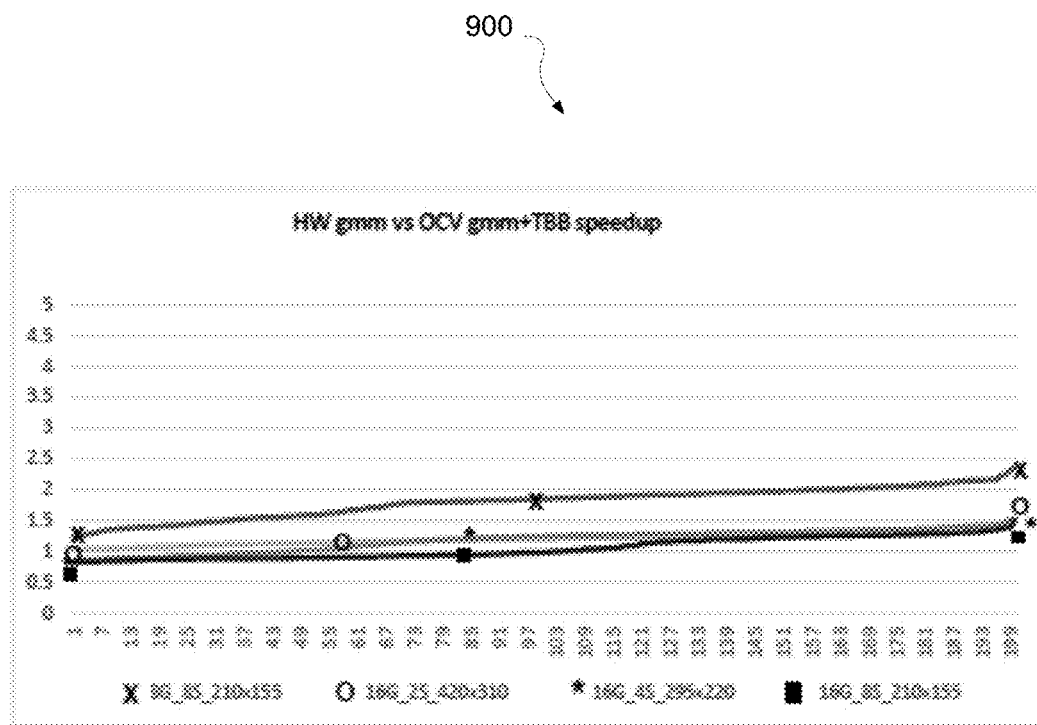
FIG. 9 illustrates an example chart of experimental results.

FIGS. 8 and 9 illustrates example charts 800 and 900 of experimental results comparing an openCV 3.0 GMM with an embodiment of one proposed GMM-SA HW, arranged in accordance with at least some implementations of the present disclosure. In the illustrated example, we compare throughput times of running 200 frames for two different configurations: 1) chart 800 of a proposed HW GMM-SA (as illustrated in FIG. 4) vs. a commercially available OCV GMM; and 2) chart 900 of a proposed HW GMM-SA (as illustrated in FIG. 4) vs a commercially available OCV GMM+TBB (Thread Building Blocks).

For each of the configurations above we run these four different sub-configurations based on scoring and image pixel dimensions:

8 Gaussian mixtures scored 8 at a time—image dimensions 210×155 pixels;

16 Gaussian mixture scored 2 at a time—image dimensions 420×310 pixels;

16 Gaussian mixture scored 4 at a time—image dimensions 295×220 pixels; and

16 Gaussian mixture scored 8 at a time—image dimensions 210×155 pixels.

Chart 800 illustrates that the proposed HW GMM-SA (as illustrated in FIG. 4) has a speedup of approximately 200 frames as compared with the commercially available OCV GMM.

Chart 800 illustrates that the proposed HW GMM-SA (as illustrated in FIG. 4) has a speedup of approximately 200 frames as compared with the commercially available OCV GMM+TBB.

Table 1, below illustrates the average proposed GMM-SA HW speedups versus the commercially available OCV GMM with out TBB and with TBB:

| 8G_8S_210 × 155 | 16G_2S_420 × 310 | 16G_4S_2950 × 220 | 16G_8S_210 × 155 |
|---|---|---|---|
| HW GMM-SA vs OCV GMM average speedup | | | |
| 3.22 | 2.27 | 2.38 | 2.24 |
| HW GMM-SA vs OCV GMM + TBB average speedup | | | |
| 1.8 | 1.21 | 1.18 | 1.05 |

FIGS. 8 and 9 show the proposed GMM-SA HW speedup of running 200 image frames versus OCV GMM with and without TBB enabled. Table 1 has the average speedup numbers of the 200 frames. The proposed GMM-SA HW runs ~2× faster compared to OCV GMM on CPU with ~50% less power consumption. On an average the proposed GMM-SA HW runs faster compared to OCV GMM+TBB with ~200% less power consumption.

Figure 10:
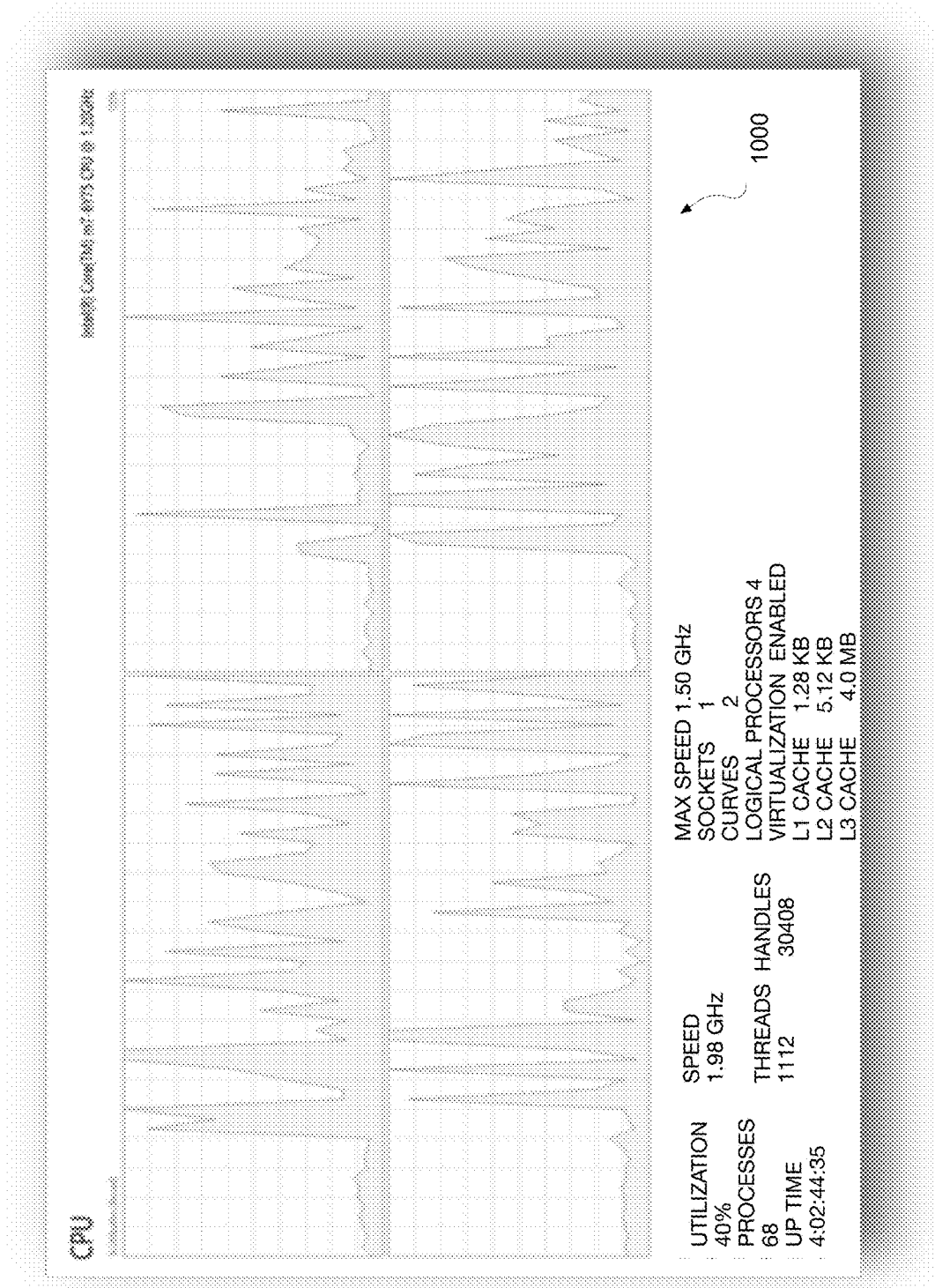
FIG. 10 an example chart of CPU utilization numbers for a commercially available product.
Figure 11:
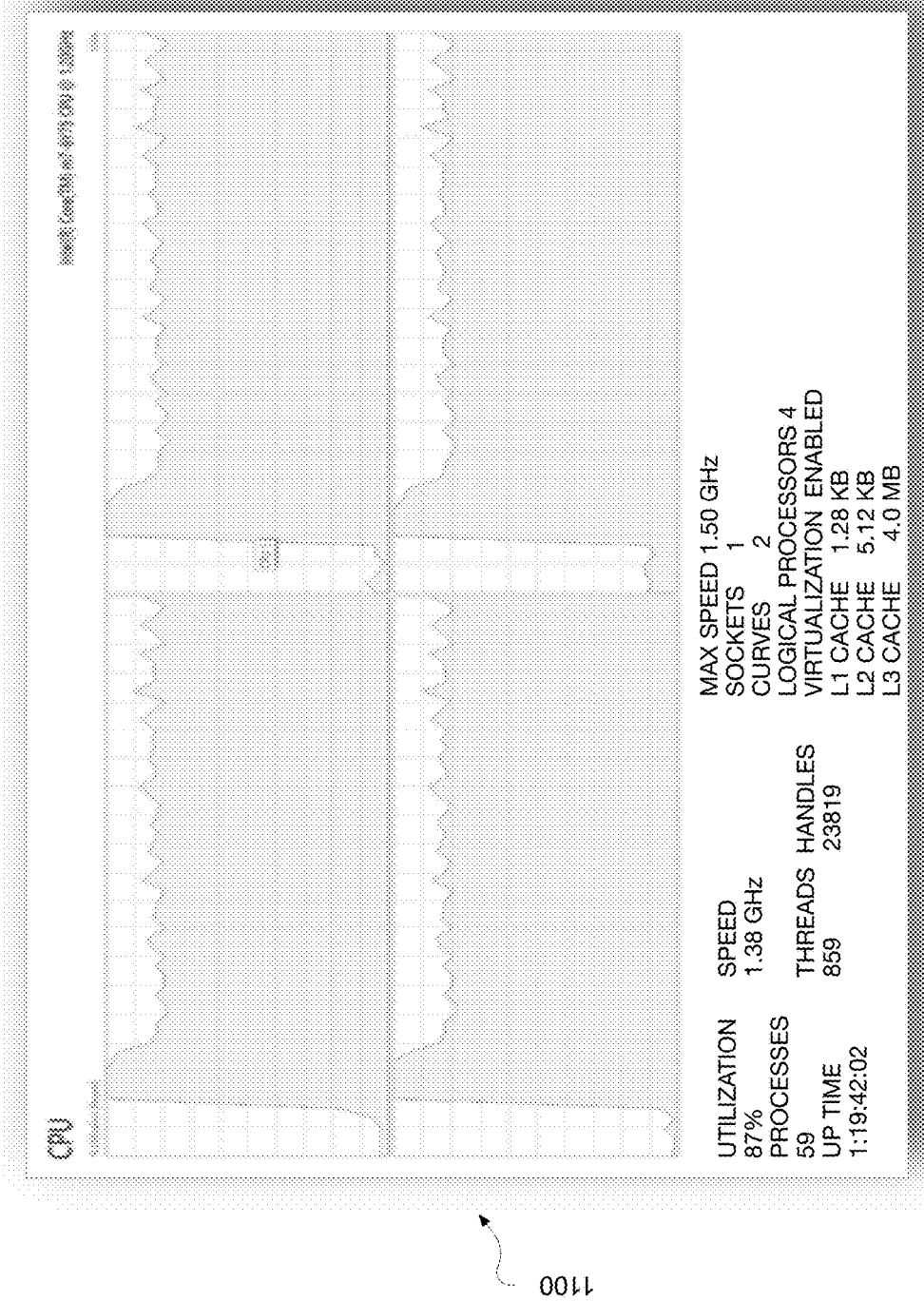
FIG. 11 an example chart of CPU utilization numbers for a commercially available product.
Figure 12:
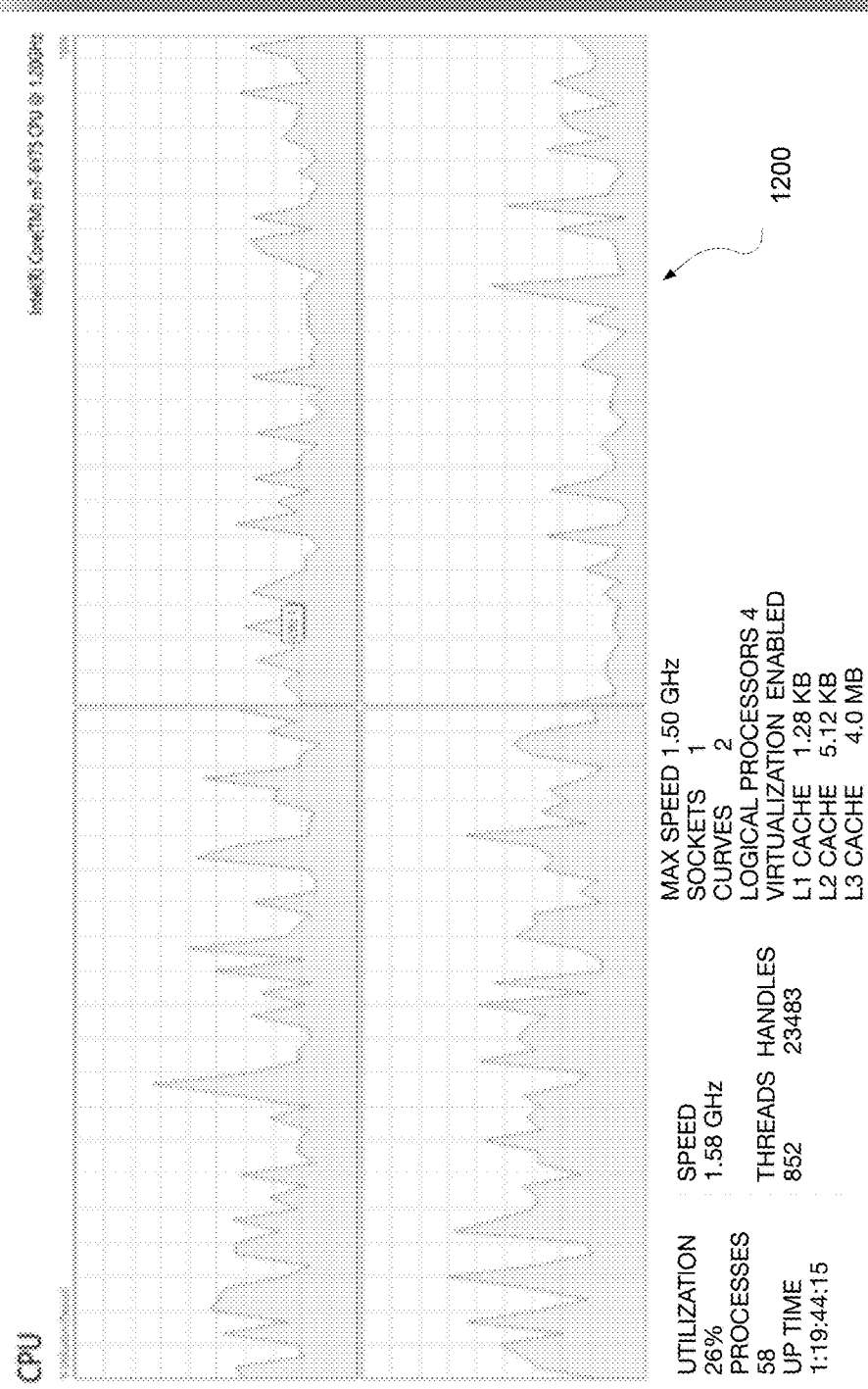
FIG. 12 an example chart of CPU utilization numbers for a proposed GMM (Gaussian Mixture Model) scoring accelerator (SA) product.

FIGS. 10, 11 and 12 illustrate CPU utilization numbers for the commercially available OCV GMM, and the commercially available OCV GMM+TBB, and the proposed GMM-SA HW, respectively.

Figure 13:
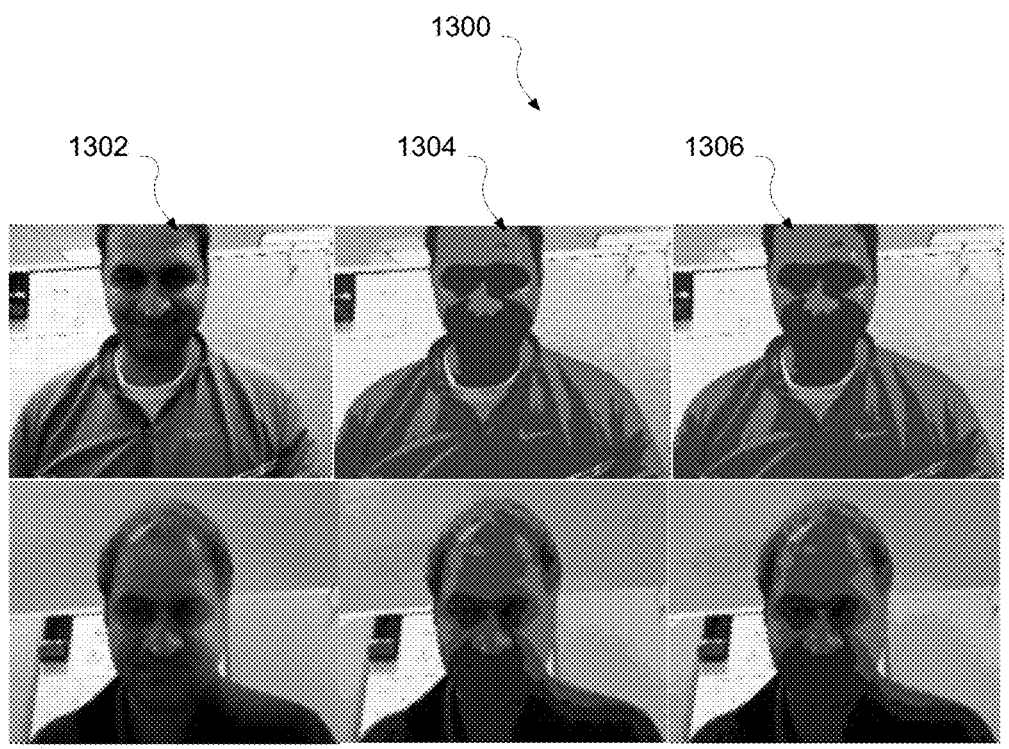
FIG. 13 is an illustrative diagram of GMM modeled output image frames.
Figure 14:
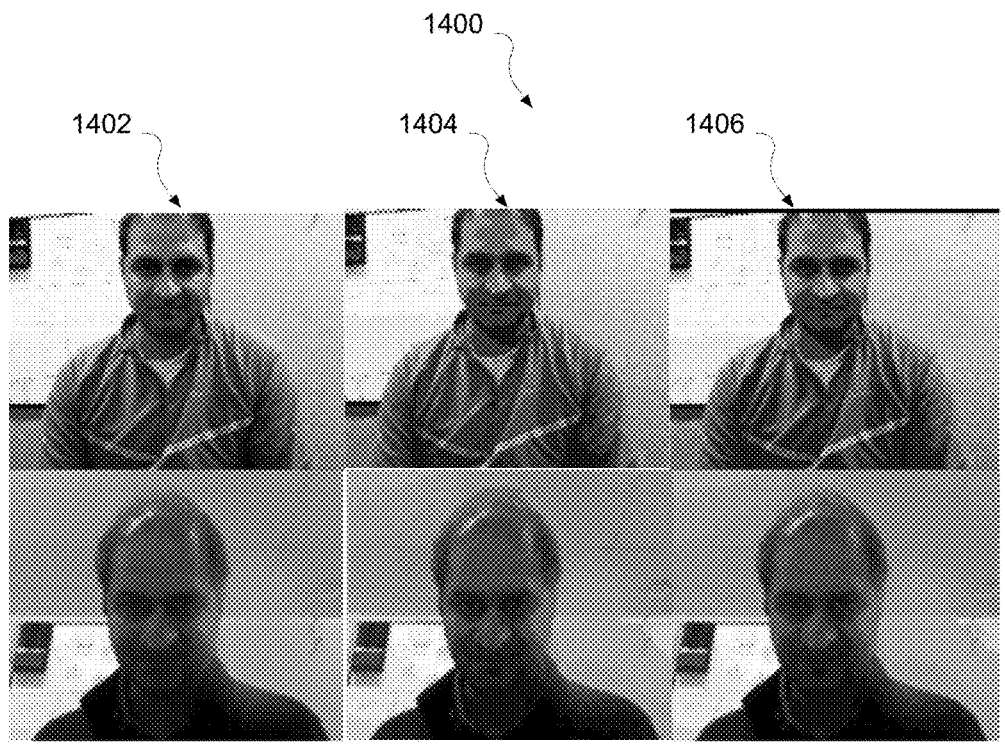
FIG. 14 is an illustrative diagram of GMM modeled output image frames.
Figure 15:
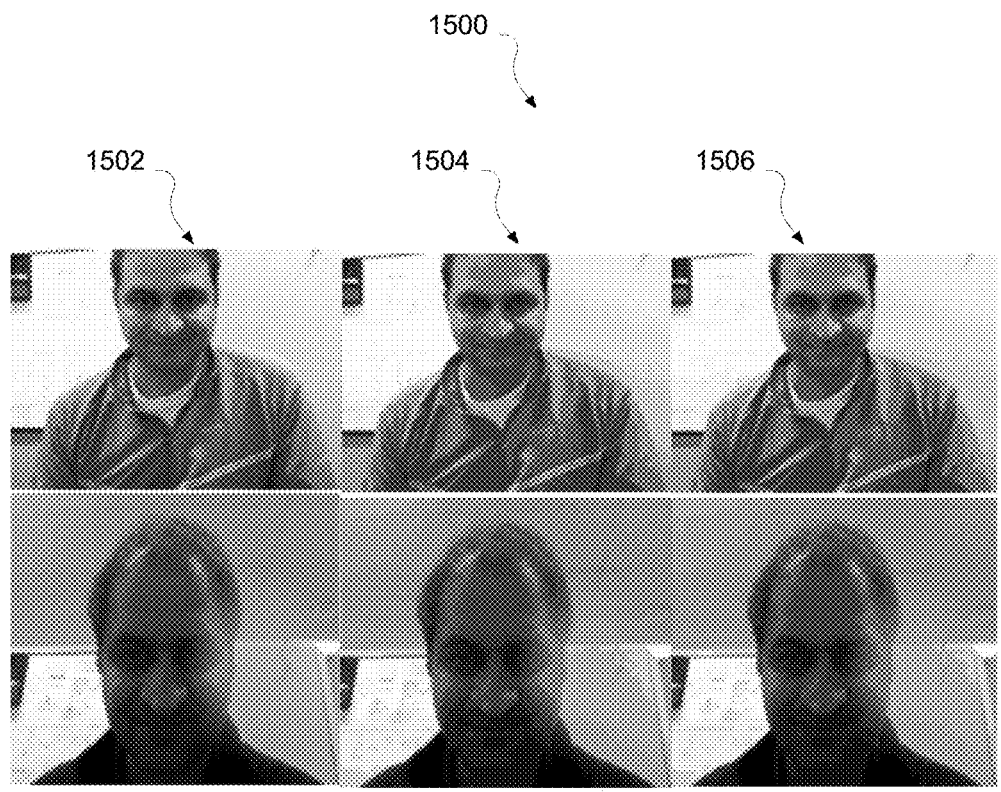
FIG. 15 is an illustrative diagram of GMM modeled output image frames.

FIGS. 13, 14 and 15 show GMM modeled input image frames 1302, 1402, and 1502 using a proposed GMM-SA HW to output frames 1304, 1404 and 1504 as compared to using a commercially available openCV GMM to output frames 1306, 1406, and 1506, respectively. The modeled images show pixel labeling corresponding to the number of Gaussians in the GMM. Each labeled pixel value is replaced with its respective Gaussian mean value.

In FIG. 13, input image frames were modeled based on a 8 Gaussian mixture, scored 8 at a time, with Dim 210×155.

In FIG. 14, input image frames were modeled based on a 16 Gaussian mixture, scored 8 at a time, Dim 210×155.

In FIG. 15, input image frames were modeled based on a 16 Gaussian mixture, scored 2 at a time, Dim 420×310.

The results illustrated in FIGS. 8-15 illustrate the successfully use of a proposed GMM-SA HW for image color density modeling. Speech and images differ fundamentally in their sample size and Gaussian component size and dimensionality. Even though the proposed GMM-SA HW may be designed for speech recognition, a creative adaptation of using this audio GMM HW for images.

In operation, running vision workloads on a dedicated HW block offers a three pronged compute strategy for vision applications. An application can utilize the power of three concurrent machines (CPU/GPU/HW Block) to achieve higher throughput and efficiency on platforms.

The following benefits of using the proposed GMM-SA HW have been shown:

at least 2× speedup when running image workloads on the proposed HW GMM-SA versus a commercially available openCV 3.0 GMM;

offloading GMM workload from CPU to the proposed GMM-SA HW reduces power consumption by ~50%;

adding TBB to a commercially available openCV 3.0 GMM increases CPU power consumption by ~200% as compared to running the workload on the proposed GMM-SA HW;

a speedup gap narrows between the proposed GMM-SA HW and a commercially available openCV 3.0 GMM+TBB, but on an average the GMM-SA HW still comes out on top;

customers can design vision application and utilize the power of three concurrent machines (CPU/GPU/HW Block) to achieve higher throughput and efficiency on platforms; and potential HW design changes in the to eliminate the software middleware, which may result in an estimated up to ~100× speedup versus a commercially available OCV GMM predict.

Figure 16:
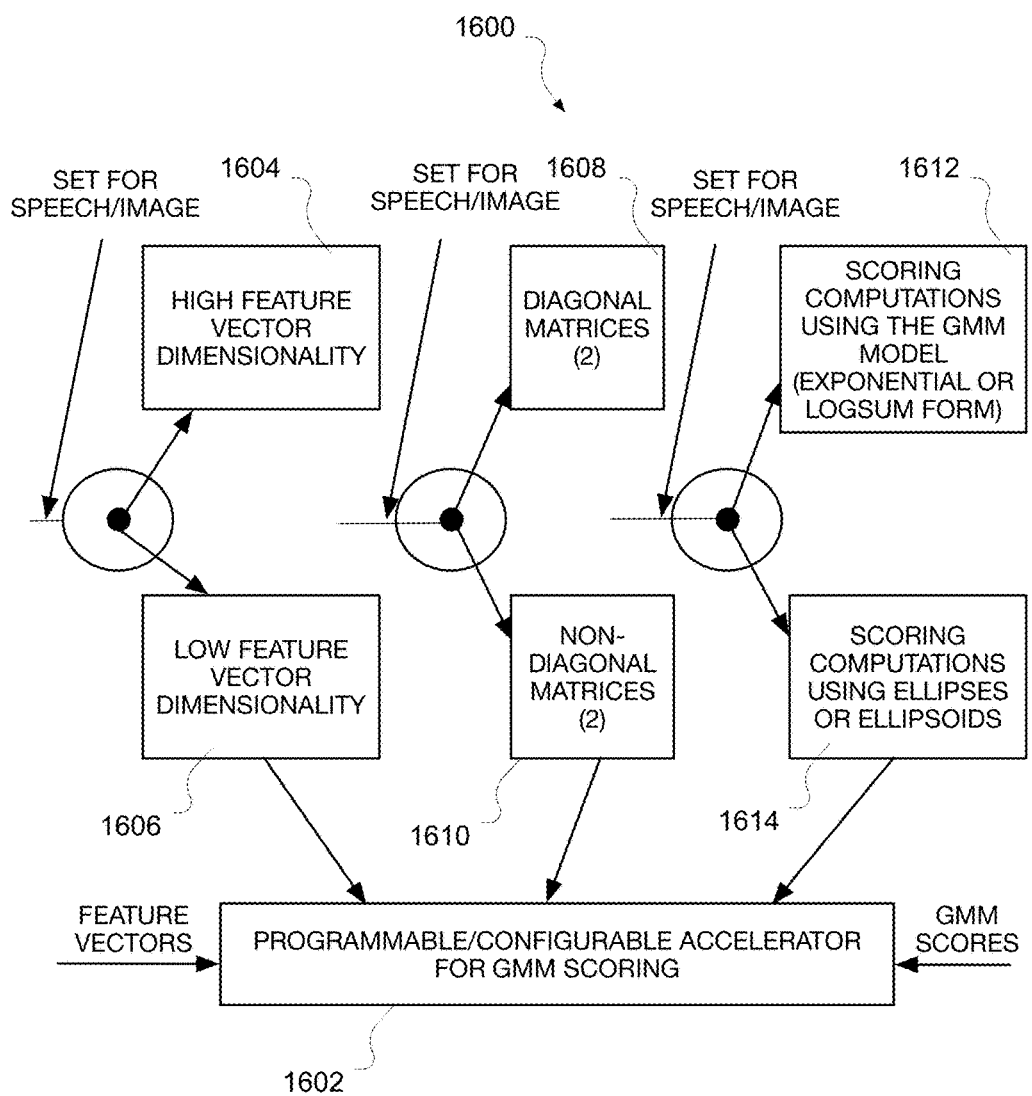
FIG. 16 is an illustrative diagram of an example configurable dual use GMM (Gaussian Mixture Model) scoring accelerator (SA)

FIG. 16 illustrates and example dual mode GMM (Gaussian Mixture Model) scoring accelerator (GMM-SA) 1600, arranged in accordance with at least some implementations of the present disclosure. In the illustrated example, GMM-SA 1600 may have a dual-mode that is configurable for speech and image GMM scoring.

A dual mode speech/imaging GMM-SA 1600 may contain programmable or reconfigurable hardware that can perform the scoring computations in a many different ways depending on the algorithm, which is accelerated. One way to configure the accelerator is to set the ratio of feature vector number over Gaussian mixture component number. Additional programmability or configurability of the accelerator is illustrated in FIG. 16.

As will be described in greater detail below, dual use GMM-SA 1600 may contain programmable or reconfigurable hardware adapted to adjust to changes between image input and speech input.

For example, programmable/configurable accelerator for GMM scoring 1602 may be adjusted based on a selection between a high feature vector dimensionality 1604 and a low feature vector dimensionality 1606 based on a change between image input and speech input.

Similarly, programmable/configurable accelerator for GMM scoring 1602 may be adjusted based on a selection between available diagonal matrices 1608 and available non-diagonal matrices 1610 based on a change between image input and speech input.

Likewise, programmable/configurable accelerator for GMM scoring 1602 may be adjusted based on a selection between scoring computations using the GMM model (e.g., exponential or LOGSUM form) 1612 and scoring computations using ellipses or ellipsoids based on a change between image input and speech input.

A key feature in the programmability or configurability of the GMM-SA 1600 of FIG. 16 is the selection of the dimensionality of the feature vectors. We remind that GMM scoring is the computation of probability density functions using the Gaussian Mixture Model of Eq. 4.

$$Pr(\tilde{x}; \theta) = \sum_{i=1}^{G} \frac{c_i}{\sqrt{(2\pi)^d \cdot |\Sigma_i|}} \cdot e^{-\frac{(\tilde{x}-\tilde{\mu}_i)^T \cdot (\Sigma_i)^{-1} \cdot (\tilde{x}-\tilde{\mu}_i)}{2}} \quad \text{Eq. 4}$$

where $\tilde{x}$ is an input vector of dimensionality d and $\theta$ is the Gaussian mixture model used by the scoring algorithm. The Gaussian mixture model $\theta$ comprises a number of Gaussian mixtures G where the i-th Gaussian mixture is associated with a GMM coefficient $c_i$, a mean value vector $\tilde{\mu}_i$ and a covariance matrix $\Sigma_i$. The GMM coefficients $c_i$, the mean value vectors $\tilde{\mu}_i$, and the covariance matrices $\Sigma_i$ for $1 \leq i \leq G$, are the parameters of the model $\theta$. Computations can be done either directly by using Eq. 4, or by using a LOGSUM approximation.

Imaging applications are typically characterized by significantly lower dimensionality of feature vectors than speech applications. For example if color modeling is performed using the Hue-Saturation (HS) or Chromatic red-Chromatic blue (CrCb) color spaces d=2. In the accelerator diagram on FIG. 16, a signal 'set for speech/image' selects between different configurations of the same hardware, where in a first configuration only feature vectors of low dimensionality are supported (e.g., 2, 3), and in a second configuration, only feature vectors of higher dimensionality (e.g., 16, 32, 64) are supported. The hardware realization of the accelerator of FIG. 16 may employ two different hardware data paths for each set of dimensionalities or, alternatively reuse the same logic supporting additions, multiplications or exponentiations in at least two different execution modes, each associated with a different set of dimensionalities.

Another way to configure the circuit of FIG. 16 is to determine whether the covariance matrices $\Sigma_i$ of the model of Eq. 4 are diagonal or not. Diagonal matrices result in simpler scoring computations, as they involve significantly fewer scalar multiplications for the computation Gaussian mixture scores. The use of diagonal matrices implies that the probability density function of Eq. 4 is modeled using components that are perfectly aligned with the axes of the coordinate system where feature vectors are represented. On the other hand if covariance matrices are not diagonal, then Gaussian mixture components may be associated with arbitrary orientations and hence more flexible in scoring the input feature vectors. Speech signals are typically associated with diagonal matrices. On the other hand, image signals may need to be processed by non-diagonal matrices especially if high recall and precision rates are required by applications such as skin detection and background subtraction.

A third way to configure the circuit of FIG. 16 is to determine whether the computations themselves follow Eq. 4 or employ alternative representations of Gaussian mixture components in the form of ellipses or ellipsoids. If Eq. 4 is used then the scoring process assigns a probability value to a feature vector. If ellipse representations of Gaussian mixture components are employed then the scoring process assigns a Boolean value (i.e., 'in' or 'out') to each feature vector, which helps with certain classification tasks (e.g., classifying a pixel as skin or not skin).

In one realization, the use of ellipses assumes that the color space dimensionality is two. If the color space dimensionality is higher than two, then the approach could use ellipsoids or other higher dimensional analogues of ellipses. In the analysis that follows we discuss how ellipse parameters derive from the mean vectors and covariance matrices of mixture components. Let the mean value vector of a mixture component (d=2) be $\tilde{\mu}_i = [\mu_x; \mu_y]$. Let also the elements of the inverse covariance matrix $\frac{1}{2} \cdot \Sigma^{-1}$ of a mixture be:

$$1/2 \cdot \sum^{-1} = \begin{bmatrix} \alpha_{00} & \alpha_{01} \\ \alpha_{01} & \alpha_{11} \end{bmatrix} \qquad \text{Eq. 5}$$

From these values the circuit of FIG. 16 can compute the major and minor radii $r_a$, $r_b$ and the rotation $\varphi$ of an ellipse region associated with the mixture component and a probability threshold T using the steps of Eq. 6-13 below. The probability threshold T may be derived from the GMM coefficient associated with a mixture.

$$C \leftarrow -\ln(T) \qquad \text{Eq. 6}$$

$$\varphi_1 \leftarrow \arctan\left(\frac{a_{11} - a_{00} + \sqrt{(a_{11} - a_{00})^2 + 4a_{01}^2}}{2a_{01}}\right) \qquad \text{Eq. 7}$$

$$\varphi_2 \leftarrow \arctan\left(\frac{a_{11} - a_{00} - \sqrt{(a_{11} - a_{00})^2 + 4a_{01}^2}}{2a_{01}}\right) \qquad \text{Eq. 8}$$

$$r_{a1} \leftarrow \sqrt{\frac{2\sin(2\varphi_1) \cdot C}{(a_{00} + a_{11}) \cdot \sin(2\varphi_1) + 2a_{01}}} \qquad \text{Eq. 9}$$

$$r_{a2} \leftarrow \sqrt{\frac{2\sin(2\varphi_2) \cdot C}{(a_{00} + a_{11}) \cdot \sin(2\varphi_2) + 2a_{01}}} \qquad \text{Eq. 10}$$

$$r_{b1} \leftarrow \sqrt{\frac{2\sin(2\varphi_1) \cdot C}{(a_{00} + a_{11}) \cdot \sin(2\varphi_1) - 2a_{01}}} \qquad \text{Eq. 11}$$

$$r_{b2} \leftarrow \sqrt{\frac{2\sin(2\varphi_2) \cdot C}{(a_{00} + a_{11}) \cdot \sin(2\varphi_2) - 2a_{01}}} \qquad \text{Eq. 12}$$

if $r_{ba1} \geq r_{b1}$ then $\varphi \leftarrow \varphi_1, r_a \leftarrow r_{a1}, r_b \leftarrow r_{b1}$  Eq. 13
else $\varphi \leftarrow \varphi_2, r_a \leftarrow r_{a2}, r_b \leftarrow r_{b2}$ A feature vector classification processes performed by the circuit of FIG. 16 would then check if an input feature vector $\tilde{x}_j = [x:y]$ is inside an ellipse region centered at $[\mu_x:\mu_y]$, associated with radii $r_a$, $r_b$ and rotation $\varphi$ using the steps of Eq. 14-17 below:

$$e_x \leftarrow (x - \mu_x) \cdot \cos \varphi + (y - \mu_y) \cdot \sin \varphi \qquad \text{Eq. 14}$$

$$e_y \leftarrow -(x - \mu_x) \cdot \sin \varphi + (y - \mu_y) \cdot \cos \varphi \qquad \text{Eq. 15}$$

$$D \leftarrow r_a^2 \cdot e_y^2 + r_b^2 \cdot e_x^2 - r_a^2 \cdot r_b^2 \qquad \text{Eq. 16}$$

If $D \leq 0$ then $[x:y]$ is inside the ellipse else it is *not*  Eq. 17

Figure 17:
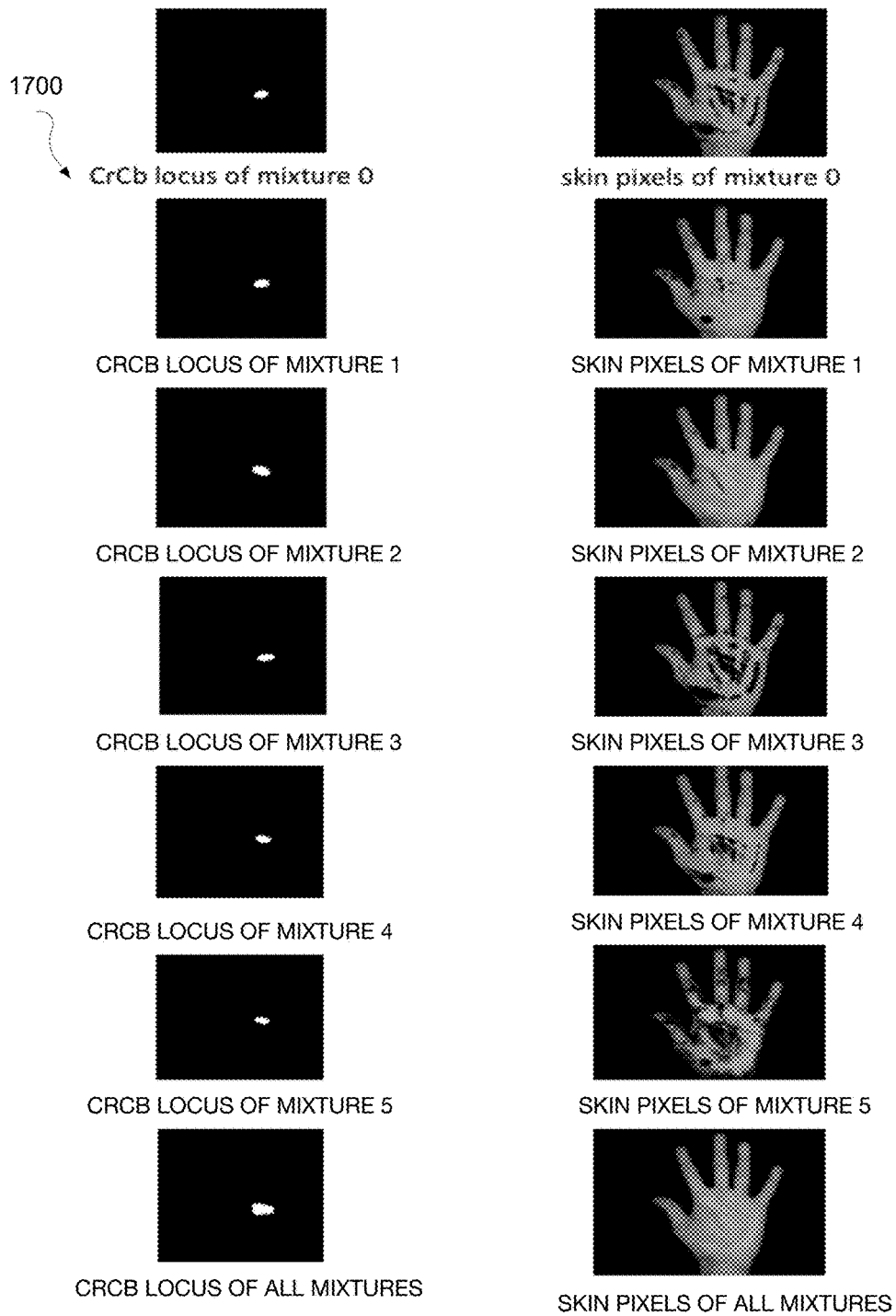
FIG. 17 is an illustrative diagram of an output images from filtering in the CrCb space using an ellipse representations of Gaussian mixtures.

The configurable circuit of FIG. 16 would support in this case both standard Gaussian Mixture Model scoring operations for speech signals and ellipse-based color filtering operations for imaging signals using eq. 6-17. A single or separate data paths could be used for this purpose Referring to FIG. 17, example images 1700 of filtering in the CrCb space using ellipse representations of Gaussian mixtures is illustrated. In FIG. 17, the skin loci associated with 6 out of 9 most dominant mixture components of a GMM model are shown together with their associated skin pixels. The union of the ellipse regions of all mixtures is also shown where skin classification in this example results in accurate hand segmentation.

Figure 18:
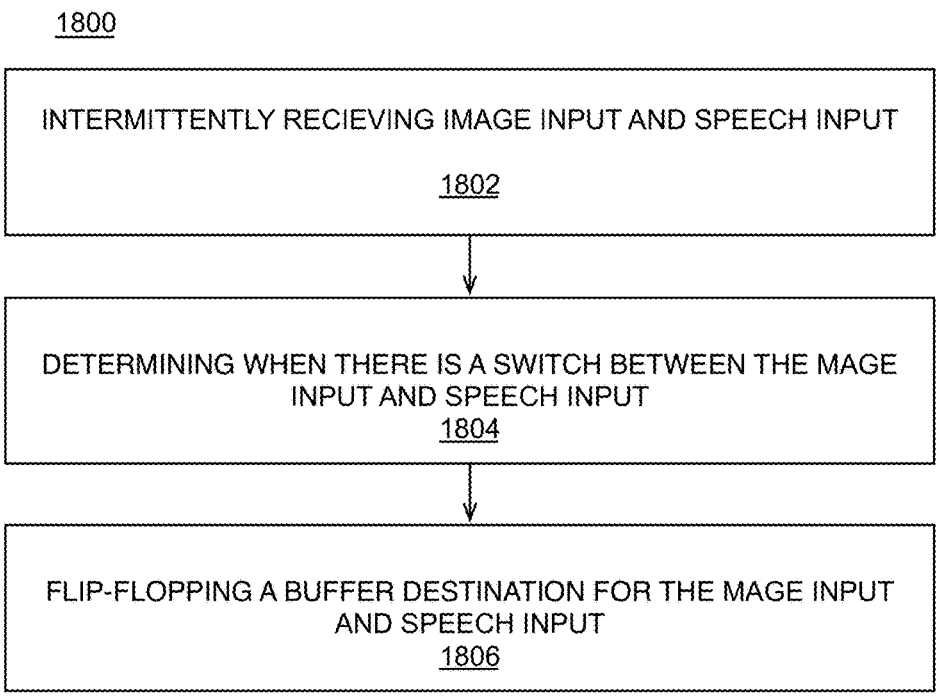
FIG. 18 is a flow chart illustrating an example scoring process.

FIG. 18 provide an illustrative diagram of dual use GMM scoring process 1800, arranged in accordance with at least some implementations of the present disclosure. In the illustrated implementation, process 1800 may include one or more operations, functions or actions as illustrated by one or more of actions 1802, 1804, 1806, etc. Although process 1800, as shown in FIG. 18, may include one particular order of blocks or actions, these blocks or actions may be performed in a different order and additional or alternative blocks or actions may also be included.

As illustrated, process 300 may begin at operation 1802 "INTERMITTENTLY RECEIVING IMAGE INPUT AND SPEECH INPUT", where image input and speech input may be received. For example image input and speech input may be intermittently received from one or more applications via a dual use module. In some examples, the image input and speech input may include a plurality of Gaussian Mixture Model means and a plurality of feature vectors.

Process 1800 may continue at operation 1804 "DETERMINING WHEN THERE IS A SWITCH BETWEEN IMAGE INPUT AND SPEECH INPUT", where a determination may be made as to when there is a switch between image input and speech input. For example, a determination may be made as to when there is a switch between image input and speech input via the dual use module.

Process 1800 may continue at operation 1806 "FLIP-FLOPPING A BUFFER DESTINATION FOR THE SPEECH INPUT AND THE IMAGE INPUT", where a buffer destination may be flip-flopped for the speech input and the image input. For example, a buffer destination may be flip-flopped for the plurality of Gaussian Mixture Model model means and the plurality of feature vectors between a speech specific buffer destination and a image specific buffer destination via the dual use module.

Additional and/or alternative details regarding process 1800 may be found below with regard to FIG. 19 and/or 20.

Figure 19:
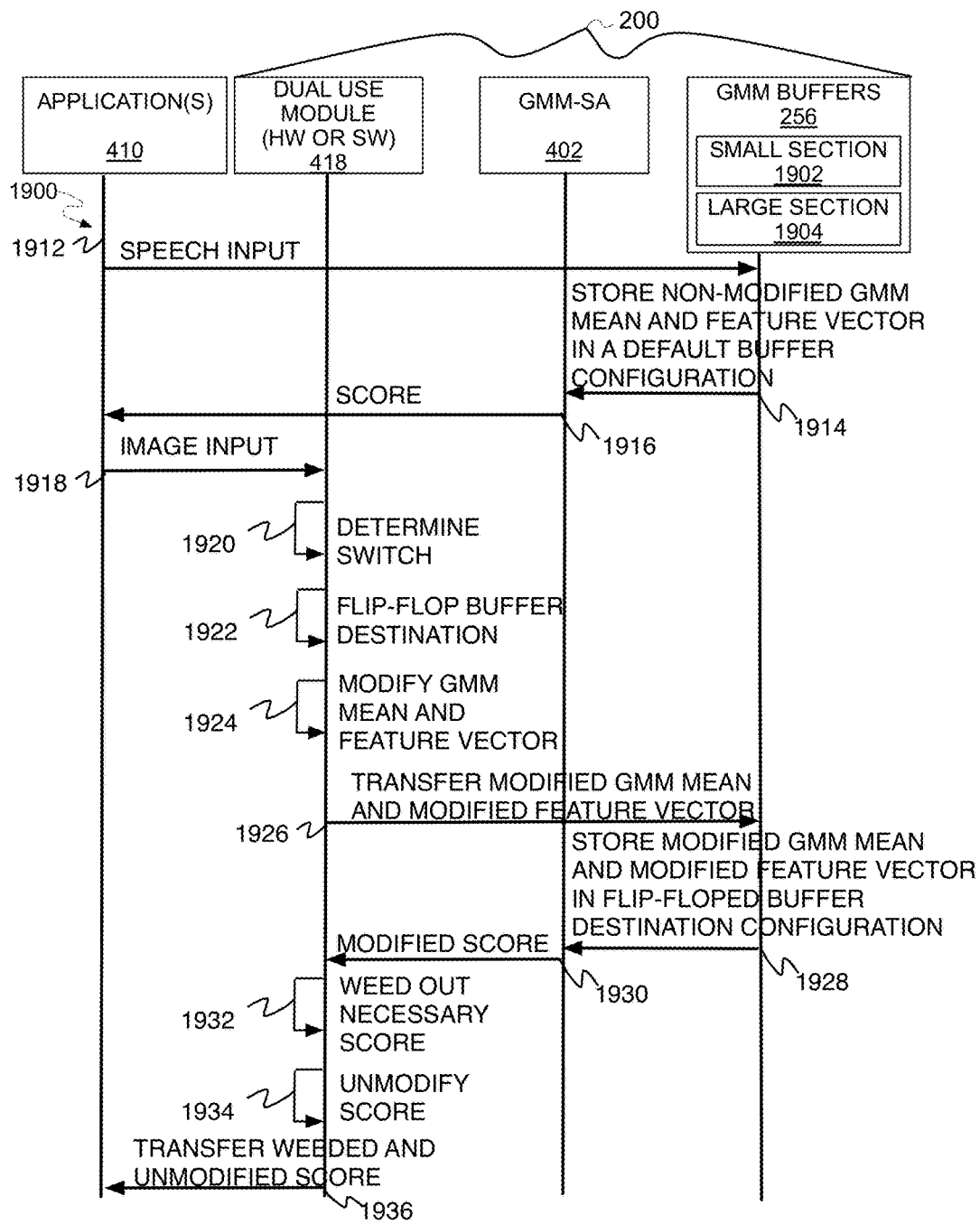
FIG. 19 is a flow chart illustrating an example scoring process.

FIG. 19 is a flow diagram illustrating an example GMM accelerator system 200 (see, e.g., FIG. 2 for more details) in operation via scoring process 1900, arranged in accordance with at least some implementations of the present disclosure. Process 1900 may include one or more operations, functions or actions as illustrated by one or more of operations 1912, etc. Although process 1900, as shown in FIG. 19, may include one particular order of blocks or actions, these blocks or actions may be performed in a different order and additional or alternative blocks or actions may also be included.

As illustrated, GMM accelerator system 200 (see, e.g., FIG. 2 for more details) may include GMM scoring accelerator 402, dual use module (implemented either in software or in hardware as part of GMM accelerator system 200), GMM buffers 256, the like, and/or combinations thereof. GMM buffers may include a relatively small buffer section 1902 and a relatively large buffer section 1904.

Process 1900 may begin at operation 1912, "SPEECH INPUT", where speech input may be received from one or more applications. In some examples, the image input may include a plurality of Gaussian Mixture Model means and a plurality of feature vectors.

Process 1900 may continue at operation 1914, "STORE NON-MODIFIED GMM MEAN AND FEATURE VECTOR IN A DEFAULT BUFFER CONFIGURATION", where non-modified GMM mean and non-modified feature vector data may be stored in a default buffer configuration. In examples, where GMM accelerator system 200 is normally configured to process a first type of input (e.g. illustrated here as speech input), the associated non-modified GMM mean and non-modified feature vector data may be stored in a default buffer configuration.

In the illustrated example, GMM accelerator system 200 may be normally configured to process a first type of input (e.g. illustrated here as speech input), and adapted through dual use module (implemented either in software or in hardware as part of GMM accelerator system 200) to adaptively process a second type or input (e.g. illustrated here as speech input). However, it will be understood that other types of input might be utilized, and that GMM accelerator system 200 might instead be normally configured to process image input instead of speech input.

In the illustrated example, when in the default buffer configuration (e.g., illustrated here as the speech specific buffer destination configuration, although it could be image specific in a different implementation) the plurality of Gaussian Mixture Model means are directed to a relatively large buffer section 1904 and the plurality of feature vectors are directed to a relatively small buffer section 1902.

Process 1900 may continue at operation 1916, "SCORE", where a GMM score may be generated based at least in part on the non-modified GMM mean and non-modified feature vector data. For example, a GMM score may be generated based at least in part on the buffered plurality of non-modified Gaussian Mixture Model means and the buffered plurality of non-modified feature vectors via Gaussian Mixture Model scoring accelerator 402.

Process 1900 may continue at operation 1918, "IMAGE IMPUT", where image input may be received. For example image input and speech input may be intermittently received from one or more applications 410 via a dual use module 418. In some examples, the image input and speech input may include a plurality of Gaussian Mixture Model means and a plurality of feature vectors.

Process 1900 may continue at operation 1920, "DETERMINE SWITCH", where a determination may be made as to when there is a switch between image input and speech input. For example, a determination may be made as to when there is a switch between image input and speech input via the dual use module 418.

Process 1900 may continue at operation 1922, "FLIP-FLOP BUFFER DESTINATION", where a buffer destination may be flip-flopped for the speech input and the image input. For example, a buffer destination may be flip-flopped for the plurality of Gaussian Mixture Model means and the plurality of feature vectors between a speech specific buffer destination and a image specific buffer destination via the dual use module 418.

Process 1900 may continue at operation 1924, "MODIFY GMM MEAN AND FEATURE VECTOR", where the GMM mean and feature vectors may be modified. For example, the GMM mean and feature vectors associated with the image data may be modified via the dual use module 418. The plurality of Gaussian Mixture Model means and the plurality of feature vectors may be modified for only a select one of either the image input or speech input (e.g., illustrated here as image input) to accommodate the flip flopping of buffer destinations and leaving the other of the non-selected one of either the image input or speech input (e.g., illustrated here as speech input) as a non-modified plurality of Gaussian Mixture Model means and plurality of feature vectors.

In examples, where GMM accelerator system 200 is not normally configured to process a second type of input (e.g. illustrated here as image input), the associated GMM mean and feature vector data may need to be modified to be stored in an alternative buffer configuration.

Process 1900 may continue at operation 1926, "TRANSFER MODIFIED GMM MEAN AND FEATURE VECTOR", where the modified GMM means and modified feature vectors may be transferred. For example, the modified GMM means and modified feature vectors may be transferred to GMM buffers 256.

Process 1900 may continue at operation 1928, "STORE MODIFIED GMM MEAN AND MODIFIED FEATURE VECTOR IN FLIP-FLOPED BUFFER DESTINATION CONFIGURATION", the modified Gaussian Mixture Model means and modified feature vectors may be stored. For example, the modified plurality of Gaussian Mixture Model means and modified plurality of feature vectors may be stored via GMM buffers 256.

In the illustrated example, when not in the default buffer configuration (e.g., illustrated here as the image specific buffer destination configuration, although it could be speech specific in a different implementation) the plurality of Gaussian Mixture Model means are flip-flopped and directed to a relatively small buffer section 1902 and the plurality of feature vectors are directed to a relatively large buffer section 1904.

Process 1900 may continue at operation 1930, "MODIFIED SCORE", where a modified GMM score may be generated based at least in part on the modified GMM mean and modified feature vector data. For example, a modified GMM score may be generated based at least in part on the buffered plurality of modified Gaussian Mixture Model means and the buffered plurality of modified feature vectors via Gaussian Mixture Model scoring accelerator 402.

In one implementation, the Gaussian Mixture Model scoring accelerator 402 may include a single use speech-specific-type scoring accelerator or a single use image-specific-type scoring accelerator. Accordingly, the dual use module 418 is implemented in software in conjunction with the Gaussian Mixture Model scoring accelerator 402 to facilitate dual usage for image and speech input.

Alternatively, in another implementation, the Gaussian Mixture Model scoring accelerator 402 may include a dual use-type scoring accelerator wherein the dual use module 418 is implemented in hardware associated with the Gaussian Mixture Model scoring accelerator 402 to facilitate dual usage for image and speech input.

Process 1900 may continue at operation 1932, "WEED OUT NECESSARY SCORE", where necessary scores may be weeded out. For example, necessary scores may be weeded out via the dual use module 418. Such operations may be performed when the present implementation is performed primarily via software middleware; however, in alternative embodiments performed primarily in hardware, such weeding out operations may not be necessary.

Additional details regarding such weeding operations can be found above with reference to FIG. 7, which shows how the weeding out occurs to get to the relevant scores.

Process 1900 may continue at operation 1934, "UNMODIFY SCORE", where the modified score may be unmodified. For example, the modified score may be unmodified based at least in part on adjusting for any prior operation to modify the plurality of Gaussian Mixture Model means and the plurality of feature vectors for only one of either the image input or speech input to accommodate the flip flopping of buffer destinations via the dual use module 418.

Process 1900 may continue at operation 1936, "TRANSFER WEEDED AND UNMODIFIED SCORE", where the weeded and unmodified score may be transferred. For example, the weeded and unmodified score may be transferred to the one or more applications 410 via the dual use module 418.

While implementation of the example processes herein may include the undertaking of all operations shown in the order illustrated, the present disclosure is not limited in this regard and, in various examples, implementation of the example processes herein may include the undertaking of only a subset of the operations shown and/or in a different order than illustrated. Additionally, although one particular set of blocks or actions is illustrated as being associated with particular modules, these blocks or actions may be associated with different modules than the particular modules illustrated here.

Various components of the systems and/or processes described herein may be implemented in software, firmware, and/or hardware and/or any combination thereof. For example, various components of the systems and/or processes described herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures.

As used in any implementation described herein, the term "module" may refer to a "component" or to a "logic unit", as these terms are described below. Accordingly, the term "module" may refer to any combination of software logic, firmware logic, and/or hardware logic configured to provide the functionality described herein. For example, one of ordinary skill in the art will appreciate that operations performed by hardware and/or firmware may alternatively be implemented via a software component, which may be embodied as a software package, code and/or instruction set, and also appreciate that a logic unit may also utilize a portion of software to implement its functionality.

As used in any implementation described herein, the term "component" refers to any combination of software logic and/or firmware logic configured to provide the functionality described herein. The software logic may be embodied as a software package, code and/or instruction set, and/or firmware that stores instructions executed by programmable circuitry. The components may, collectively or individually, be embodied for implementation as part of a larger system, for example, an integrated circuit (IC), system on-chip (SoC), and so forth.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the systems discussed herein. Further, one of ordinary skill in the art will appreciate that operations performed by hardware and/or firmware may also utilize a portion of software to implement the functionality of the logic unit.

In addition, any one or more of the blocks of the processes described herein may be undertaken in response to instructions provided by one or more computer program products. Such program products may include signal bearing media providing instructions that, when executed by, for example, a processor may provide the functionality described herein. The computer program products may be provided in any form of computer readable medium. Thus, for example, a processor including one or more processor core(s) may undertake one or more of the blocks shown in FIGS. 18 and 19 in response to instructions conveyed to the processor by a computer readable medium.

Additional and/or alternative details regarding process 1900 may be found below with regard to FIG. 20.

Figure 20:
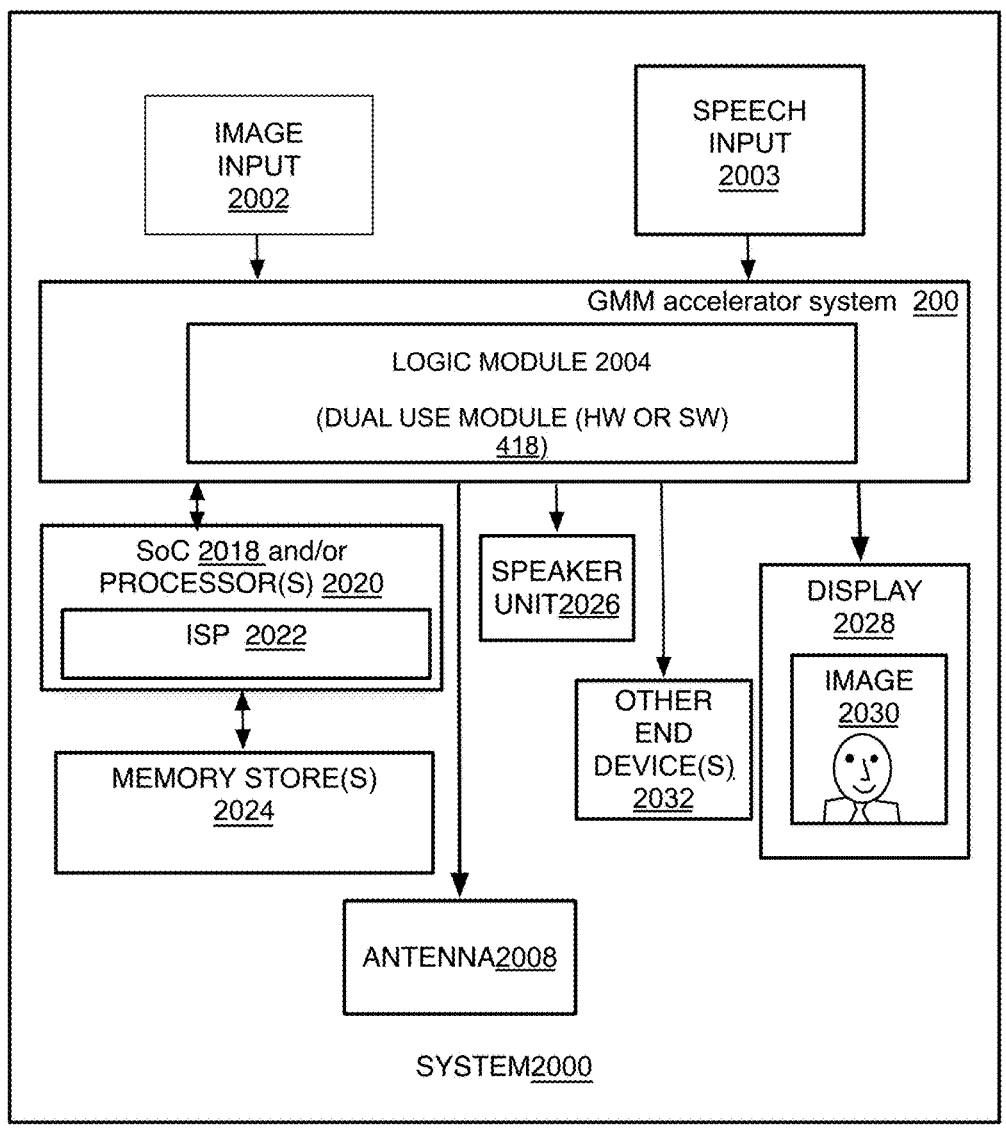
FIG. 20 is a flow chart illustrating an example system.

Referring to FIG. 20, an example system 2000 is arranged in accordance with at least some implementations of the present disclosure. In various implementations, the example system 2000 may include GMM accelerator system 200, as described above with regard to FIG. 2.

GMM accelerator system 200 may receive a image input 2002 and/or may receive an speech input 2003. This can be implemented in various ways. Thus, in one form, the speech recognition processing system 2000 may be an audio capture device such as a microphone. Such technology may include a telephone, a smart phone, a dictation machine, other sound recording machine, a mobile device or an on-board device, wearables such as a smart watch, smart glasses, smart headphones, or exercise band, or any combination of these.

In the illustrated example, GMM accelerator system 200 may include logic modules 2004, which may include a dual use module 418. Dual use module 418 may operate in a manner as described in FIG. 19. Logic modules 2004 may be implemented via hardware, software, firmware, and/or a combination thereof on GMM accelerator system 200, as described above with regard to FIG. 2. GMM accelerator system 200 and/or dual use module 418 may be operated by, or even entirely or partially located at, a system on chip (SoC) 2018 and/or processor(s) 2020.

In the present implementation, system 2000 may have a system on chip (SoC) (or integrated circuit) device 2018 and/or processor(s) 2020. While one or more processors could be provided on the system 2000 external to the system on chip device 2018, the system on chip device 2018 may include one or more processor(s) 2020, which may include one or more processor cores. The system 2000 may have one or more external memory stores 2024 that are external to the SoC device 2018, a speaker unit 2026 to provide auditory output to a user in response to the speech input 2003, one or more displays 2028 (which may be touchscreens) to provide images 2030 as a visual output to a user in response to the video input 2002, and other end device(s) 2032 to perform actions in response to the video input 2002 and/or speech input 2003. As illustrated, any of these components may be capable of communication with one another and/or communication with portions of logic modules 2004 and/or GMM accelerator system 200. Thus, SoC device 2018 and/or processors 2020 may be communicatively coupled to logic modules 2004 and/or GMM accelerator system 200 for operating those components. By one approach, although system 2000, as shown in FIG. 20, may include one particular set of blocks or actions associated with particular components or modules, these blocks or actions may be associated with different components or modules than the particular component or module illustrated here.

Figure 21:
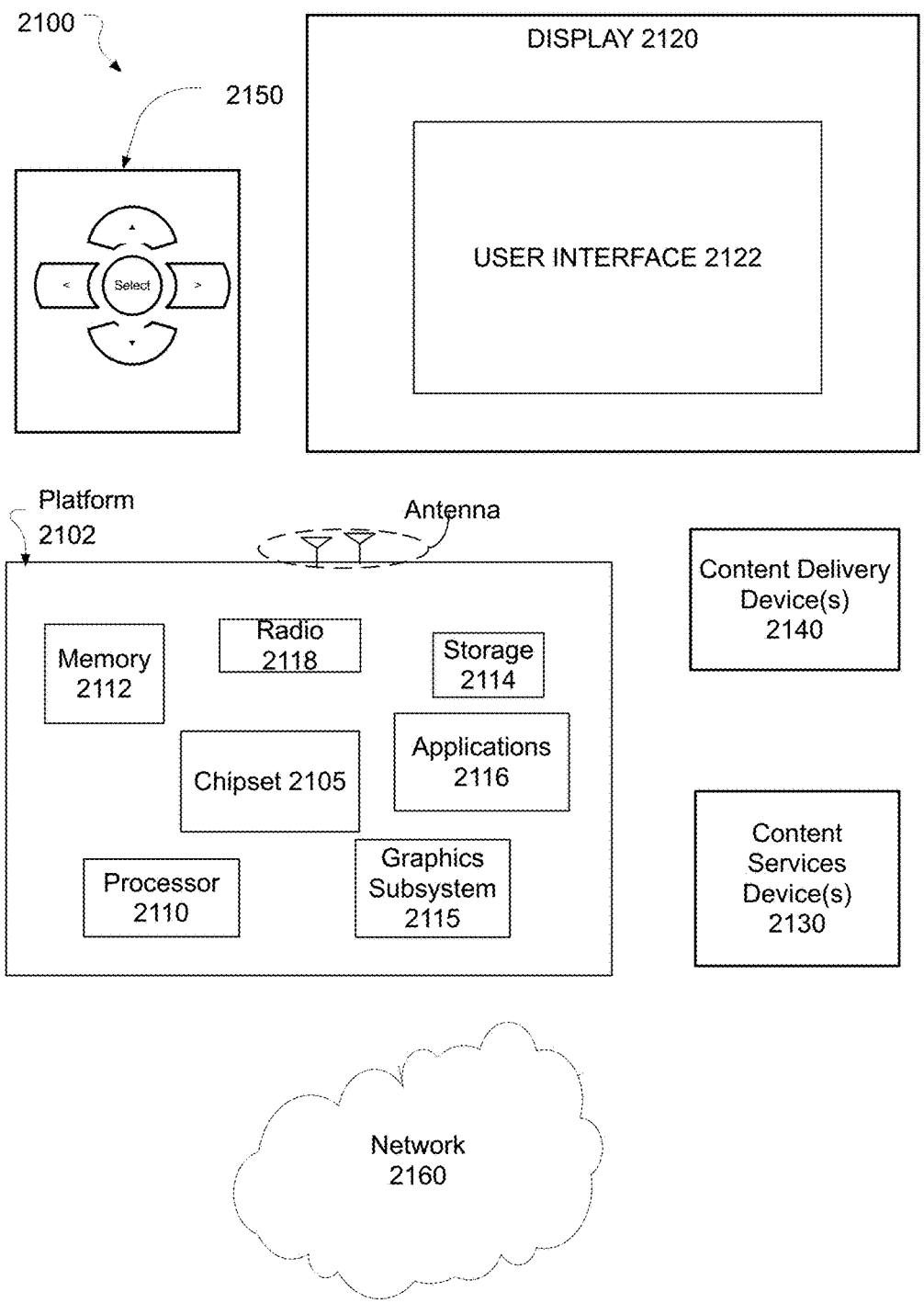
FIG. 21 is an illustrative diagram of an example system.

FIG. 21 illustrates an example system 2100 in accordance with the present disclosure. In various implementations, system 2100 may be a media system although system 2100 is not limited to this context. For example, system 2100 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 2100 includes a platform 2102 coupled to a display 2120. Platform 2102 may receive content from a content device such as content services device(s) 2130 or content delivery device(s) 2140 or other similar content sources. A navigation controller 2150 including one or more navigation features may be used to interact with, for example, platform 2102 and/or display 2120. Each of these components is described in greater detail below.

In various implementations, platform 2102 may include any combination of a chipset 2105, processor 2110, memory 2112, storage 2114, graphics subsystem 2115, applications 2116 and/or radio 2118. Chipset 2105 may provide intercommunication among processor 2110, memory 2112, storage 2114, graphics subsystem 2115, applications 2116 and/or radio 2118. For example, chipset 2105 may include a storage adapter (not depicted) capable of providing intercommunication with storage 2114.

Processor 2110 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 2110 may be dual-core processor(s), dual-core mobile processor(s), and so forth.

Memory 2112 may be implemented as a volatile memory device such as, but not limited to, a Random Access Memory (RAM), Dynamic Random Access Memory (DRAM), or Static RAM (SRAM).

Storage 2114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 2114 may include technology to increase the storage performance enhanced protection for valuable digital media when multiple hard drives are included, for example.

Graphics subsystem 2115 may perform processing of images such as still or video for display. Graphics subsystem 2115 may be a graphics processing unit (GPU) or a visual processing unit (VPU), for example. An analog or digital interface may be used to communicatively couple graphics subsystem 2115 and display 2120. For example, the interface may be any of a High-Definition Multimedia Interface, Display Port, wireless HDMI, and/or wireless HD compliant techniques. Graphics subsystem 2115 may be integrated into processor 2110 or chipset 2105. In some implementations, graphics subsystem 2115 may be a stand-alone card communicatively coupled to chipset 2105.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 2118 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 2118 may operate in accordance with one or more applicable standards in any version.

In various implementations, display 2120 may include any television type monitor or display. Display 2120 may include, for example, a computer display screen, touch screen display, video monitor, television-like device, and/or a television. Display 2120 may be digital and/or analog. In various implementations, display 2120 may be a holographic display. Also, display 2120 may be a transparent surface that may receive a visual projection. Such projections may convey various forms of information, images, and/or objects. For example, such projections may be a visual overlay for a mobile augmented reality (MAR) application. Under the control of one or more software applications 2116, platform 2102 may display user interface 2122 on display 2120.

In various implementations, content services device(s) 2130 may be hosted by any national, international and/or independent service and thus accessible to platform 2102 via the Internet, for example. Content services device(s) 2130 may be coupled to platform 2102 and/or to display 2120. Platform 2102 and/or content services device(s) 2130 may be coupled to a network 2160 to communicate (e.g., send and/or receive) media information to and from network 2160. Content delivery device(s) 2140 also may be coupled to platform 2102 and/or to display 2120.

In various implementations, content services device(s) 2130 may include a cable television box, personal computer, network, telephone, Internet enabled devices or appliance capable of delivering digital information and/or content, and any other similar device capable of unidirectionally or bidirectionally communicating content between content providers and platform 2102 and/display 2120, via network 2160 or directly. It will be appreciated that the content may be communicated unidirectionally and/or bidirectionally to and from any one of the components in system 2100 and a content provider via network 2160. Examples of content may include any media information including, for example, video, music, medical and gaming information, and so forth.

Content services device(s) 2130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 2102 may receive control signals from navigation controller 2150 having one or more navigation features. The navigation features of controller 2150 may be used to interact with user interface 2122, for example. In embodiments, navigation controller 2150 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 2150 may be replicated on a display (e.g., display 2120) by movements of a pointer, cursor, focus ring, or other visual indicators displayed on the display. For example, under the control of software applications 2116, the navigation features located on navigation controller 2150 may be mapped to virtual navigation features displayed on user interface 2122, for example. In embodiments, controller 2150 may not be a separate component but may be integrated into platform 2102 and/or display 2120. The present disclosure, however, is not limited to the elements or in the context shown or described herein.

In various implementations, drivers (not shown) may include technology to enable users to instantly turn on and off platform 2102 like a television with the touch of a button after initial boot-up, when enabled, for example. Program logic may allow platform 2102 to stream content to media adaptors or other content services device(s) 2130 or content delivery device(s) 2140 even when the platform is turned "off." In addition, chipset 2105 may include hardware and/or software support for 21.1 surround sound audio and/or high definition (7.1) surround sound audio, for example. Drivers may include a graphics driver for integrated graphics platforms. In embodiments, the graphics driver may include a peripheral component interconnect (PCI) Express graphics card.

In various implementations, any one or more of the components shown in system 2100 may be integrated. For example, platform 2102 and content services device(s) 2130 may be integrated, or platform 2102 and content delivery device(s) 2140 may be integrated, or platform 2102, content services device(s) 2130, and content delivery device(s) 2140 may be integrated, for example. In various embodiments, platform 2102 and display 2120 may be an integrated unit. Display 2120 and content service device(s) 2130 may be integrated, or display 2120 and content delivery device(s) 2140 may be integrated, for example. These examples are not meant to limit the present disclosure.

In various embodiments, system 2100 may be implemented as a wireless system, a wired system, or a combination of both. When implemented as a wireless system, system 2100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 2100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 2102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 21.

Figure 22:
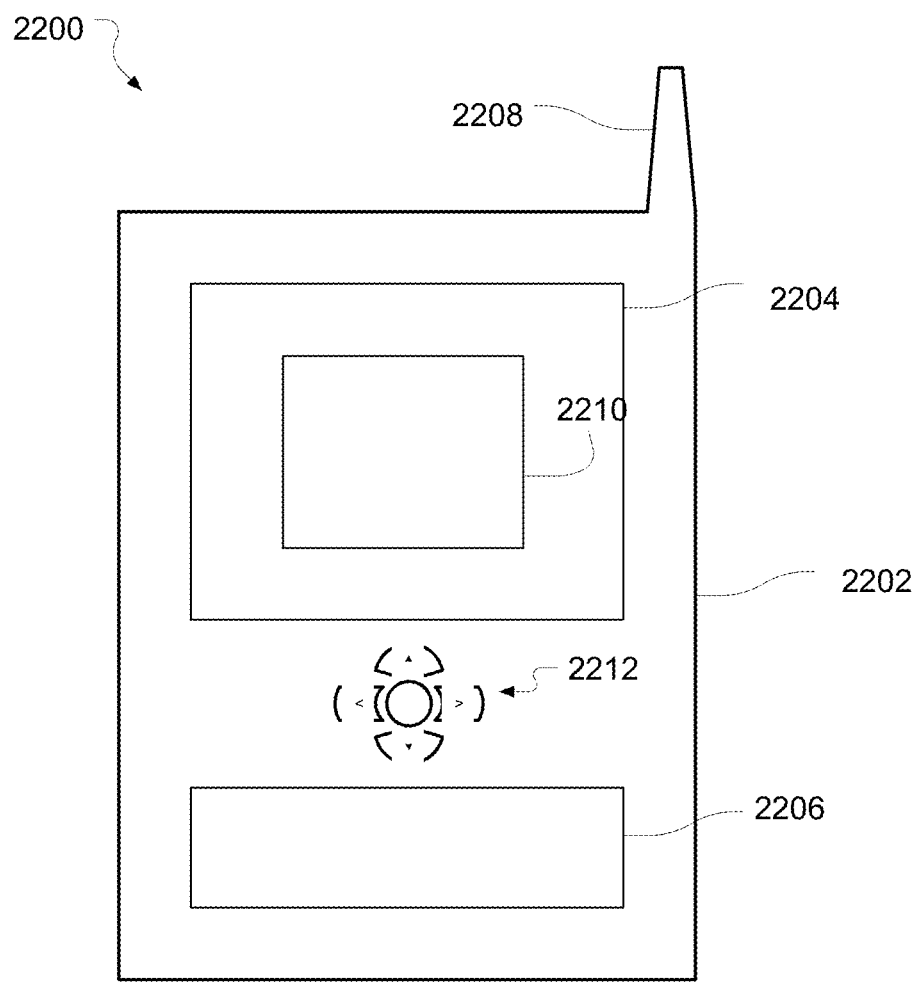
FIG. 22 is an illustrative diagram of an example system, all arranged in accordance with at least some implementations of the present disclosure.

As described above, system 2100 may be embodied in varying physical styles or form factors. FIG. 22 illustrates implementations of a small form factor device 2200 in which system 2100 may be embodied. In embodiments, for example, device 2200 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 22, device 2200 may include a housing 2202, a display 2204, an input/output (I/O) device 2206, and an antenna 2208. Device 2200 also may include navigation features 2212. Display 2204 may include any suitable display unit for displaying information appropriate for a mobile computing device. I/O device 2206 may include any suitable I/O device for entering information into a mobile computing device. Examples for I/O device 2206 may include an alphanumeric keyboard, a numeric keypad, a touch pad, input keys, buttons, switches, rocker switches, microphones, speakers, voice recognition device and software, and so forth. Information also may be entered into device 2200 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one example, a computer-implemented method may include intermittently receiving, via a dual use module, image input and speech input from one or more applications, where the image input and speech input include a plurality of Gaussian Mixture Model means and a plurality of feature vectors. The dual use module may determine when there is a switch between image input and speech input. The dual use module may flip-flop a buffer destination for the plurality of Gaussian Mixture Model means and the plurality of feature vectors between a speech specific buffer destination and a image specific buffer destination.

A computer-implemented method may further include scoring, via a Gaussian Mixture Model scoring accelerator, based at least in part on a buffered plurality of Gaussian Mixture Model means and a buffered plurality of feature vectors. The Gaussian Mixture Model scoring accelerator may include a single use speech-specific-type scoring accelerator or a single use image-specific-type scoring accelerator, and where the dual use module is implemented in software in conjunction with the Gaussian Mixture Model scoring accelerator to facilitate dual usage for image and speech input.

A computer-implemented method may further include scoring, via a Gaussian Mixture Model scoring accelerator, based at least in part on a buffered plurality of Gaussian Mixture Model means and a buffered plurality of feature vectors. The Gaussian Mixture Model scoring accelerator may include a dual use-type scoring accelerator where the dual use module is implemented in hardware associated with the Gaussian Mixture Model scoring accelerator to facilitate dual usage for image and speech input.

In a computer-implemented method, when in the speech specific buffer destination configuration, the plurality of Gaussian Mixture Model means are directed to a relatively large buffer section and the plurality of feature vectors are directed to a relatively small buffer section. When in the image specific buffer destination configuration, the plurality of Gaussian Mixture Model means are directed to a relatively small buffer section and the plurality of feature vectors are directed to a relatively large buffer section. The flip-flopping of the buffer destination is based at least in part on: detecting a change between a relatively high feature vector dimensionality associated with the image input and a relatively low feature vector dimensionality associated with the speech input, detecting a change between available diagonal matrices associated with the image input and available non-diagonal matrices associated with the speech input, and/or detecting a change between ellipses or ellipsoids-type scoring computations associated with the image input and GMM model-type scoring computations associated with the speech input. The dual use module may modify the plurality of Gaussian Mixture Model means and the plurality of feature vectors for only a select one of either the image input or speech input to accommodate the flip flopping of buffer destinations and leaving the other of the non-selected one of either the image input or speech input as a non-modified plurality of Gaussian Mixture Model means and plurality of feature vectors. Gaussian Mixture Model buffers may store the modified and non-modified plurality of Gaussian Mixture Model means and plurality of feature vectors. A Gaussian Mixture Model scoring accelerator may perform scoring operations based at least in part on a buffered plurality of Gaussian Mixture Model means and a buffered plurality of feature vectors. The dual use module may weed out necessary scores. The dual use module may unmodify scores based at least in part on adjusting for any prior operation to modify the plurality of Gaussian Mixture Model means and the plurality of feature vectors for only one of either the image input or speech input to accommodate the flip flopping of buffer destinations. The dual use module may transfer the weeded and unmodified scores to the one or more applications.

In another example, a computer-implemented apparatus for scoring operations may include a Gaussian Mixture Model scoring accelerator hardware and a dual use module associated with the Gaussian Mixture Model scoring accelerator hardware. The Gaussian Mixture Model scoring accelerator hardware may be configured to perform scoring operations based at least in part on a buffered plurality of Gaussian Mixture Model means and a buffered plurality of feature vectors. The dual use module may be configured to: intermittently receive image input and speech input from one or more applications, where the image input and speech input include a plurality of Gaussian Mixture Model means and a plurality of feature vectors; determine when there is a switch between image input and speech input; and flip-flop a buffer destination for the plurality of Gaussian Mixture Model means and the plurality of feature vectors between a speech specific buffer destination and a image specific buffer destination.

In a computer-implemented apparatus, the Gaussian Mixture Model scoring accelerator hardware may include a single use speech-specific-type scoring accelerator or a single use image-specific-type scoring accelerator, and where the dual use module is implemented in software in conjunction with the Gaussian Mixture Model scoring accelerator hardware to facilitate dual usage for image and speech input.

In a computer-implemented apparatus, the Gaussian Mixture Model scoring accelerator hardware may include a dual use-type scoring accelerator hardware where the dual use module is implemented in hardware of the Gaussian Mixture Model scoring accelerator hardware to facilitate dual usage for image and speech input.

In a computer-implemented apparatus, when in the speech specific buffer destination configuration, the plurality of Gaussian Mixture Model means are directed to a relatively large buffer section and the plurality of feature vectors are directed to a relatively small buffer section. When in the image specific buffer destination configuration the plurality of Gaussian Mixture Model means are directed to a relatively small buffer section and the plurality of feature vectors are directed to a relatively large buffer section. The flip-flopping of the buffer destination is based at least in part on: detecting a change between a relatively high feature vector dimensionality associated with the image input and a relatively low feature vector dimensionality associated with the speech input, detecting a change between available diagonal matrices associated with the image input and available non-diagonal matrices associated with the speech input, and/or detecting a change between ellipses or ellipsoids-type scoring computations associated with the image input and GMM model-type scoring computations associated with the speech input. The dual use module may be further configured to modify the plurality of Gaussian Mixture Model means and the plurality of feature vectors for only a select one of either the image input or speech input to accommodate the flip flopping of buffer destinations and leaving the other of the non-selected one of either the image input or speech input as a non-modified plurality of Gaussian Mixture Model means and plurality of feature vectors. The dual use module may be further configured to weed out necessary scores. The dual use module may be further configured to unmodify scores based at least in part on adjusting for any prior operation to modify the plurality of Gaussian Mixture Model means and the plurality of feature vectors for only one of either the image input or speech input to accommodate the flip flopping of buffer destinations. The dual use module may be further configured to transfer the weeded and unmodified scores to the one or more applications.

In a further example, a computer-implemented system for scoring operations may include a plurality of Gaussian Mixture Model buffers, a Gaussian Mixture Model scoring accelerator hardware in communication with the plurality of Gaussian Mixture Model buffers, and a dual use module associated with the Gaussian Mixture Model scoring accelerator hardware. The plurality of Gaussian Mixture Model buffers may be configured to store a plurality of Gaussian Mixture Model means and a plurality of feature vectors. The Gaussian Mixture Model scoring accelerator hardware may be configured to perform scoring operations based at least in part on a buffered plurality of Gaussian Mixture Model means and a buffered plurality of feature vectors. The dual use module may be configured to: intermittently receive image input and speech input from one or more applications, where the image input and speech input include a plurality of Gaussian Mixture Model means and a plurality of feature vectors; determine when there is a switch between image input and speech input; and flip-flop a buffer destination for the plurality of Gaussian Mixture Model means and the plurality of feature vectors between a speech specific buffer destination and a image specific buffer destination.

In a computer-implemented system for scoring operations, when in the speech specific buffer destination configuration, the plurality of Gaussian Mixture Model means are directed to a relatively large buffer section and the plurality of feature vectors are directed to a relatively small buffer section. When in the image specific buffer destination configuration the plurality of Gaussian Mixture Model means are directed to a relatively small buffer section and the plurality of feature vectors are directed to a relatively large buffer section. The flip-flopping of the buffer destination is based at least in part on: detecting a change between a relatively high feature vector dimensionality associated with the image input and a relatively low feature vector dimensionality associated with the speech input, detecting a change between available diagonal matrices associated with the image input and available non-diagonal matrices associated with the speech input, and/or detecting a change between ellipses or ellipsoids-type scoring computations associated with the image input and GMM model-type scoring computations associated with the speech input. The dual use module may be further configured to modify the plurality of Gaussian Mixture Model means and the plurality of feature vectors for only a select one of either the image input or speech input to accommodate the flip flopping of buffer destinations and leaving the other of the non-selected one of either the image input or speech input as a non-modified plurality of Gaussian Mixture Model means and plurality of feature vectors. The dual use module may be further configured to weed out necessary scores. The dual use module may be further configured to unmodify scores based at least in part on adjusting for any prior operation to modify the plurality of Gaussian Mixture Model means and the plurality of feature vectors for only one of either the image input or speech input to accommodate the flip flopping of buffer destinations. The dual use module may be further configured to transfer the weeded and unmodified scores to the one or more applications.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed:

1. A computer-implemented method for scoring operations, comprising:
intermittently receiving, via a dual use module, image input and speech input from one or more applications, wherein the image input and speech input include a plurality of Gaussian Mixture Model means and a plurality of feature vectors;
determining, via the dual use module, when there is a switch between image input and speech input; and
flip-flopping, via the dual use module, a buffer destination for the plurality of Gaussian Mixture Model means and the plurality of feature vectors between a speech specific buffer destination and an image specific buffer destination.

2. The method of claim 1, further comprising:
scoring, via a Gaussian Mixture Model scoring accelerator, based at least in part on a buffered plurality of Gaussian Mixture Model means and a buffered plurality of feature vectors, wherein the Gaussian Mixture Model scoring accelerator comprises a single use speech-specific-type scoring accelerator or a single use image-specific-type scoring accelerator, and wherein the dual use module is implemented in software in conjunction with the Gaussian Mixture Model scoring accelerator to facilitate dual usage for image and speech input.

3. The method of claim 1, further comprising:

scoring, via a Gaussian Mixture Model scoring accelerator, based at least in part on a buffered plurality of Gaussian Mixture Model means and a buffered plurality of feature vectors, wherein the Gaussian Mixture Model scoring accelerator comprises a dual use-type scoring accelerator wherein the dual use module is implemented in hardware associated with the Gaussian Mixture Model scoring accelerator to facilitate dual usage for image and speech input.

4. The method of claim 1, wherein the flip-flopping of the buffer destination is based at least in part on detecting a change between a relatively high feature vector dimensionality associated with the image input and a relatively low feature vector dimensionality associated with the speech input.

5. The method of claim 1, wherein the flip-flopping of the buffer destination is based at least in part on detecting a change between available diagonal matrices associated with the image input and available non-diagonal matrices associated with the speech input.

6. The method of claim 1, wherein the flip-flopping of the buffer destination is based at least in part on detecting a change between ellipses or ellipsoids-type scoring computations associated with the image input and GMM model-type scoring computations associated with the speech input.

7. The method of claim 1, wherein in the speech specific buffer destination configuration the plurality of Gaussian Mixture Model means are directed to a relatively large buffer section and the plurality of feature vectors are directed to a relatively small buffer section, and wherein in the image specific buffer destination configuration the plurality of Gaussian Mixture Model means are directed to a relatively small buffer section and the plurality of feature vectors are directed to a relatively large buffer section.

8. The method of claim 1, further comprising:

modifying, via the dual use module, the plurality of Gaussian Mixture Model means and the plurality of feature vectors for only a select one of either the image input or speech input to accommodate the flip flopping of buffer destinations and leaving the other of the non-selected one of either the image input or speech input as a non-modified plurality of Gaussian Mixture Model means and plurality of feature vectors;

scoring, via a Gaussian Mixture Model scoring accelerator, based at least in part on a buffered plurality of Gaussian Mixture Model means and a buffered plurality of feature vectors; and unmodifying, via the dual use module, scores based at least in part on adjusting for any prior operation to modify the plurality of Gaussian Mixture Model means and the plurality of feature vectors for only one of either the image input or speech input to accommodate the flip flopping of buffer destinations.

9. The method of claim 1, further comprising:

scoring, via a Gaussian Mixture Model scoring accelerator, based at least in part on a buffered plurality of Gaussian Mixture Model means and a buffered plurality of feature vectors; and weeding out necessary scores, via the dual use module.

10. The method of claim 1, further comprising:

wherein in the speech specific buffer destination configuration the plurality of Gaussian Mixture Model means are directed to a relatively large buffer section and the plurality of feature vectors are directed to a relatively small buffer section, wherein in the image specific buffer destination configuration the plurality of Gaussian Mixture Model means are directed to a relatively small buffer section and the plurality of feature vectors are directed to a relatively large buffer section, wherein the flip-flopping of the buffer destination is based at least in part on: detecting a change between a relatively high feature vector dimensionality associated with the image input and a relatively low feature vector dimensionality associated with the speech input, detecting a change between available diagonal matrices associated with the image input and available non-diagonal matrices associated with the speech input, and/or detecting a change between ellipses or ellipsoids-type scoring computations associated with the image input and GMM model-type scoring computations associated with the speech input, modifying, via the dual use module, the plurality of Gaussian Mixture Model means and the plurality of feature vectors for only a select one of either the image input or speech input to accommodate the flip flopping of buffer destinations and leaving the other of the non-selected one of either the image input or speech input as a non-modified plurality of Gaussian Mixture Model means and plurality of feature vectors;

storing, via Gaussian Mixture Model buffers, the modified and non-modified plurality of Gaussian Mixture Model means and plurality of feature vectors;

scoring, via a Gaussian Mixture Model scoring accelerator, based at least in part on a buffered plurality of Gaussian Mixture Model means and a buffered plurality of feature vectors;

weeding out necessary scores, via the dual use module;

unmodifying, via the dual use module, scores based at least in part on adjusting for any prior operation to modify the plurality of Gaussian Mixture Model means and the plurality of feature vectors for only one of either the image input or speech input to accommodate the flip flopping of buffer destinations; and transferring, via the dual use module, the weeded and unmodified scores to the one or more applications.

11. A computer-implemented apparatus for scoring operations, comprising:

a Gaussian Mixture Model scoring accelerator hardware, the Gaussian Mixture Model scoring accelerator hardware configured to perform scoring operations based at least in part on a buffered plurality of Gaussian Mixture Model means and a buffered plurality of feature vectors;

a dual use module associated with the Gaussian Mixture Model scoring accelerator hardware, the dual use module configured to:

intermittently receive image input and speech input from one or more applications, wherein the image input and speech input include a plurality of Gaussian Mixture Model means and a plurality of feature vectors;

determine when there is a switch between image input and speech input; and flip-flop a buffer destination for the plurality of Gaussian Mixture Model means and the plurality of feature vectors between a speech specific buffer destination and an image specific buffer destination.

12. The apparatus of claim 11, wherein the Gaussian Mixture Model scoring accelerator hardware comprises a single use speech-specific-type scoring accelerator or a single use image-specific-type scoring accelerator, and wherein the dual use module is implemented in software in conjunction with the Gaussian Mixture Model scoring accelerator hardware to facilitate dual usage for image and speech input.

13. The apparatus of claim 11, wherein the Gaussian Mixture Model scoring accelerator hardware comprises a dual use-type scoring accelerator hardware wherein the dual use module is implemented in hardware of the Gaussian Mixture Model scoring accelerator hardware to facilitate dual usage for image and speech input.

14. The apparatus of claim 11, wherein the flip-flopping of the buffer destination is based at least in part on: detecting a change between a relatively high feature vector dimensionality associated with the image input and a relatively low feature vector dimensionality associated with the speech input, detecting a change between available diagonal matrices associated with the image input and available non-diagonal matrices associated with the speech input, and/or detecting a change between ellipses or ellipsoids-type scoring computations associated with the image input and GMM model-type scoring computations associated with the speech input.

15. The apparatus of claim 11, further comprising:
the dual use module further configured to modify the plurality of Gaussian Mixture Model means and the plurality of feature vectors for only a select one of either the image input or speech input to accommodate the flip flopping of buffer destinations and leaving the other of the non-selected one of either the image input or speech input as a non-modified plurality of Gaussian Mixture Model means and plurality of feature vectors; and the dual use module further configured to unmodify scores based at least in part on adjusting for any prior operation to modify the plurality of Gaussian Mixture Model means and the plurality of feature vectors for only one of either the image input or speech input to accommodate the flip flopping of buffer destinations.

16. The apparatus of claim 11, further comprising:
wherein in the speech specific buffer destination configuration the plurality of Gaussian Mixture Model means are directed to a relatively large buffer section and the plurality of feature vectors are directed to a relatively small buffer section, wherein in the image specific buffer destination configuration the plurality of Gaussian Mixture Model means are directed to a relatively small buffer section and the plurality of feature vectors are directed to a relatively large buffer section, wherein the flip-flopping of the buffer destination is based at least in part on: detecting a change between a relatively high feature vector dimensionality associated with the image input and a relatively low feature vector dimensionality associated with the speech input, detecting a change between available diagonal matrices associated with the image input and available non-diagonal matrices associated with the speech input, and/or detecting a change between ellipses or ellipsoids-type scoring computations associated with the image input and GMM model-type scoring computations associated with the speech input, the dual use module further configured to modify the plurality of Gaussian Mixture Model means and the plurality of feature vectors for only a select one of either the image input or speech input to accommodate the flip flopping of buffer destinations and leaving the other of the non-selected one of either the image input or speech input as a non-modified plurality of Gaussian Mixture Model means and plurality of feature vectors;

the dual use module further configured to weed out necessary scores;

the dual use module further configured to unmodify scores based at least in part on adjusting for any prior operation to modify the plurality of Gaussian Mixture Model means and the plurality of feature vectors for only one of either the image input or speech input to accommodate the flip flopping of buffer destinations; and the dual use module further configured to transfer the weeded and unmodified scores to the one or more applications.

17. A computer-implemented system for scoring operations, comprising:
a plurality of Gaussian Mixture Model buffers, the plurality of Gaussian Mixture Model buffers configured to store a plurality of Gaussian Mixture Model means and a plurality of feature vectors;

a Gaussian Mixture Model scoring accelerator hardware in communication with the plurality of Gaussian Mixture Model buffers, the Gaussian Mixture Model scoring accelerator hardware configured to perform scoring operations based at least in part on a buffered plurality of Gaussian Mixture Model means and a buffered plurality of feature vectors;

a dual use module associated with the Gaussian Mixture Model scoring accelerator hardware, the dual use module configured to:

intermittently receive image input and speech input from one or more applications, wherein the image input and speech input include a plurality of Gaussian Mixture Model means and a plurality of feature vectors;

determine when there is a switch between image input and speech input; and flip-flop a buffer destination for the plurality of Gaussian Mixture Model means and the plurality of feature vectors between a speech specific buffer destination and an image specific buffer destination.

18. The system of claim 17, wherein the flip-flopping of the buffer destination is based at least in part on: detecting a change between a relatively high feature vector dimensionality associated with the image input and a relatively low feature vector dimensionality associated with the speech input, detecting a change between available diagonal matrices associated with the image input and available non-diagonal matrices associated with the speech input, and/or detecting a change between ellipses or ellipsoids-type scoring computations associated with the image input and GMM model-type scoring computations associated with the speech input.

19. The system of claim 17, further comprising:
the dual use module further configured to modify the plurality of Gaussian Mixture Model means and the plurality of feature vectors for only a select one of either the image input or speech input to accommodate the flip flopping of buffer destinations and leaving the other of the non-selected one of either the image input or speech input as a non-modified plurality of Gaussian Mixture Model means and plurality of feature vectors; and the dual use module further configured to unmodify scores based at least in part on adjusting for any prior operation to modify the plurality of Gaussian Mixture Model means and the plurality of feature vectors for only one of either the image input or speech input to accommodate the flip flopping of buffer destinations.

20. The system of claim 17, further comprising:

wherein in the speech specific buffer destination configuration the plurality of Gaussian Mixture Model means are directed to a relatively large buffer section and the plurality of feature vectors are directed to a relatively small buffer section, wherein in the image specific buffer destination configuration the plurality of Gaussian Mixture Model means are directed to a relatively small buffer section and the plurality of feature vectors are directed to a relatively large buffer section, wherein the flip-flopping of the buffer destination is based at least in part on: detecting a change between a relatively high feature vector dimensionality associated with the image input and a relatively low feature vector dimensionality associated with the speech input, detecting a change between available diagonal matrices associated with the image input and available non-diagonal matrices associated with the speech input, and/or detecting a change between ellipses or ellipsoids-type scoring computations associated with the image input and GMM model-type scoring computations associated with the speech input, the dual use module further configured to modify the plurality of Gaussian Mixture Model means and the plurality of feature vectors for only a select one of either the image input or speech input to accommodate the flip flopping of buffer destinations and leaving the other of the non-selected one of either the image input or speech input as a non-modified plurality of Gaussian Mixture Model means and plurality of feature vectors;

the dual use module further configured to weed out necessary scores;

the dual use module further configured to unmodify scores based at least in part on adjusting for any prior operation to modify the plurality of Gaussian Mixture Model means and the plurality of feature vectors for only one of either the image input or speech input to accommodate the flip flopping of buffer destinations; and the dual use module further configured to transfer the weeded and unmodified scores to the one or more applications.

21. At least one non-transitory machine readable medium comprising: a plurality of instructions that in response to being executed on a computing device, causes the computing device to perform the following operations, comprising:

intermittently receiving, via a dual use module, image input and speech input from one or more applications, wherein the image input and speech input include a plurality of Gaussian Mixture Model means and a plurality of feature vectors;

determining, via the dual use module, when there is a switch between image input and speech input; and flip-flopping, via the dual use module, a buffer destination for the plurality of Gaussian Mixture Model means and the plurality of feature vectors between a speech specific buffer destination and an image specific buffer destination.

22. The at least one non-transitory machine readable medium method of claim 21, further comprising:

wherein in the speech specific buffer destination configuration the plurality of Gaussian Mixture Model means are directed to a relatively large buffer section and the plurality of feature vectors are directed to a relatively small buffer section, wherein in the image specific buffer destination configuration the plurality of Gaussian Mixture Model means are directed to a relatively small buffer section and the plurality of feature vectors are directed to a relatively large buffer section, wherein the flip-flopping of the buffer destination is based at least in part on: detecting a change between a relatively high feature vector dimensionality associated with the image input and a relatively low feature vector dimensionality associated with the speech input, detecting a change between available diagonal matrices associated with the image input and available non-diagonal matrices associated with the speech input, and/or detecting a change between ellipses or ellipsoids-type scoring computations associated with the image input and GMM model-type scoring computations associated with the speech input, modifying, via the dual use module, the plurality of Gaussian Mixture Model means and the plurality of feature vectors for only a select one of either the image input or speech input to accommodate the flip flopping of buffer destinations and leaving the other of the non-selected one of either the image input or speech input as a non-modified plurality of Gaussian Mixture Model means and plurality of feature vectors;

weeding out necessary scores, via the dual use module;

unmodifying, via the dual use module, scores based at least in part on adjusting for any prior operation to modify the plurality of Gaussian Mixture Model means and the plurality of feature vectors for only one of either the image input or speech input to accommodate the flip flopping of buffer destinations; and transferring, via the dual use module, the weeded and unmodified scores to the one or more applications.

* * * * *